United States Patent
Sagasaki

(10) Patent No.: US 11,982,988 B2
(45) Date of Patent: May 14, 2024

(54) NUMERICAL CONTROL DEVICE, MACHINE LEARNING DEVICE, AND NUMERICAL CONTROL METHOD

(71) Applicant: Mitsubishi Electric Corporation, Tokyo (JP)

(72) Inventor: Masakazu Sagasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 457 days.

(21) Appl. No.: 17/441,291

(22) PCT Filed: Jun. 27, 2019

(86) PCT No.: PCT/JP2019/025560
§ 371 (c)(1),
(2) Date: Sep. 21, 2021

(87) PCT Pub. No.: WO2020/261473
PCT Pub. Date: Dec. 30, 2020

(65) Prior Publication Data
US 2022/0179388 A1   Jun. 9, 2022

(51) Int. Cl.
*G05B 19/18* (2006.01)

(52) U.S. Cl.
CPC .. *G05B 19/182* (2013.01); *G05B 2219/39241* (2013.01)

(58) Field of Classification Search
None
See application file for complete search history.

(56) References Cited

U.S. PATENT DOCUMENTS

| 9,477,216 B2 | 10/2016 | Tezuka et al. |
| 10,503,141 B2 | 12/2019 | Tezuka et al. |
| 2011/0246132 A1 | 10/2011 | Sato et al. |

(Continued)

FOREIGN PATENT DOCUMENTS

| JP | 2006-312223 A | 11/2006 |
| JP | 2009-175793 A | 8/2009 |

(Continued)

OTHER PUBLICATIONS

International Search Report and Written Opinion dated Sep. 10, 2019, received for PCT Application PCT/JP2019/025560, Filed on Jun. 27, 2019, 10 pages including English Translation.

(Continued)

*Primary Examiner* — Sean Shechtman
(74) *Attorney, Agent, or Firm* — XSENSUS LLP

(57) ABSTRACT

A numerical control device includes—a screen processing unit that divides a waveform of a commanded oscillatory movement quantity specified by a vibration cutting command and a waveform of an actual position detected by detectors, into sections each corresponding to a unit time, and this screen processing unit displays, on a display unit, an n-th commanded oscillation waveform, which is an n-th waveform of the commanded oscillatory movement quantity; an (n+1)-th commanded oscillation waveform, which is an (n+1)-th waveform of the commanded oscillatory movement quantity; an n-th actual position waveform, which is an n-th waveform of the actual position; and an (n+1)-th actual position waveform, which is an (n+1)-th waveform of the actual position, being superimposed on one another along a time axis, where n is a natural number.

18 Claims, 12 Drawing Sheets

(56) References Cited

U.S. PATENT DOCUMENTS

2016/0154404 A1    6/2016   Saitou et al.
2018/0335765 A1   11/2018   Tezuka et al.

FOREIGN PATENT DOCUMENTS

| | | |
|---|---|---|
| JP | 2010-92405 A | 4/2010 |
| JP | 5444412 B2 | 12/2013 |
| JP | 2016-103193 A | 6/2016 |
| JP | 2018-195002 A | 12/2018 |
| JP | 6530780 B2 | 5/2019 |
| WO | 2010/067651 A1 | 6/2010 |

OTHER PUBLICATIONS

Notice of Reasons for Refusal dated Jun. 23, 2020, received for JP Application 2020-515987, 10 pages including English Translation.
Japanese Office Action dated Apr. 4, 2022, in Japanese Application No. 2020-515987.

```
401  M3 S1000;              (SPINDLE ROTATION COMMAND)
402  G200 A0.03 D1.5;       (START VIBRATION CUTTING; A: AMPLITUDE,
                            D: THE NUMBER OF CYCLES OF OSCILLATION
                            PER ROTATION OF SPINDLE)
403  G01 X10.0 Z20.0 F0.10; (LINEAR INTERPOLATION)
404  G02 X14.0 Z23.5 R4.0;  (ARC INTERPOLATION)
405  G201;                  (TERMINATE VIBRATION CUTTING)
```

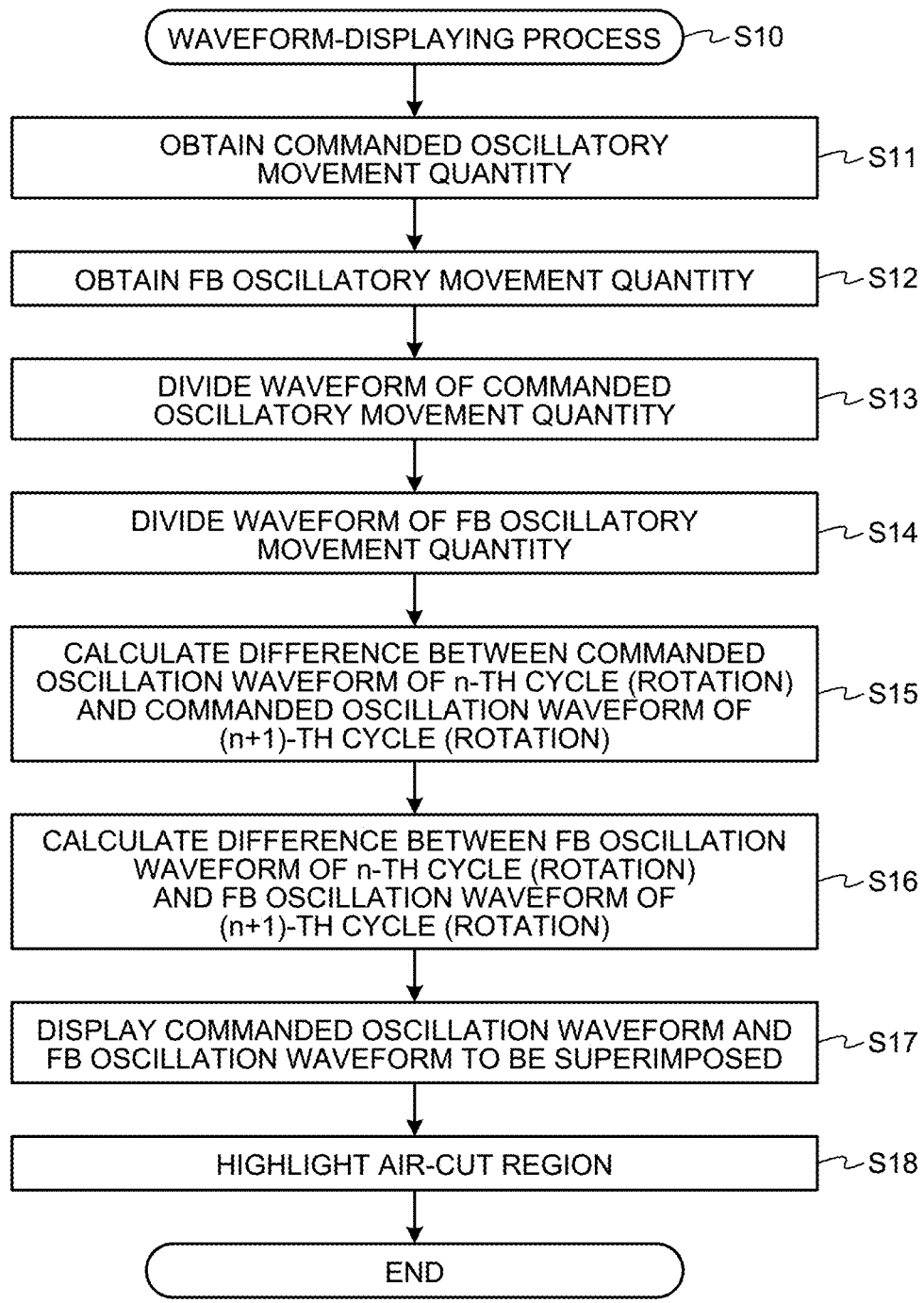

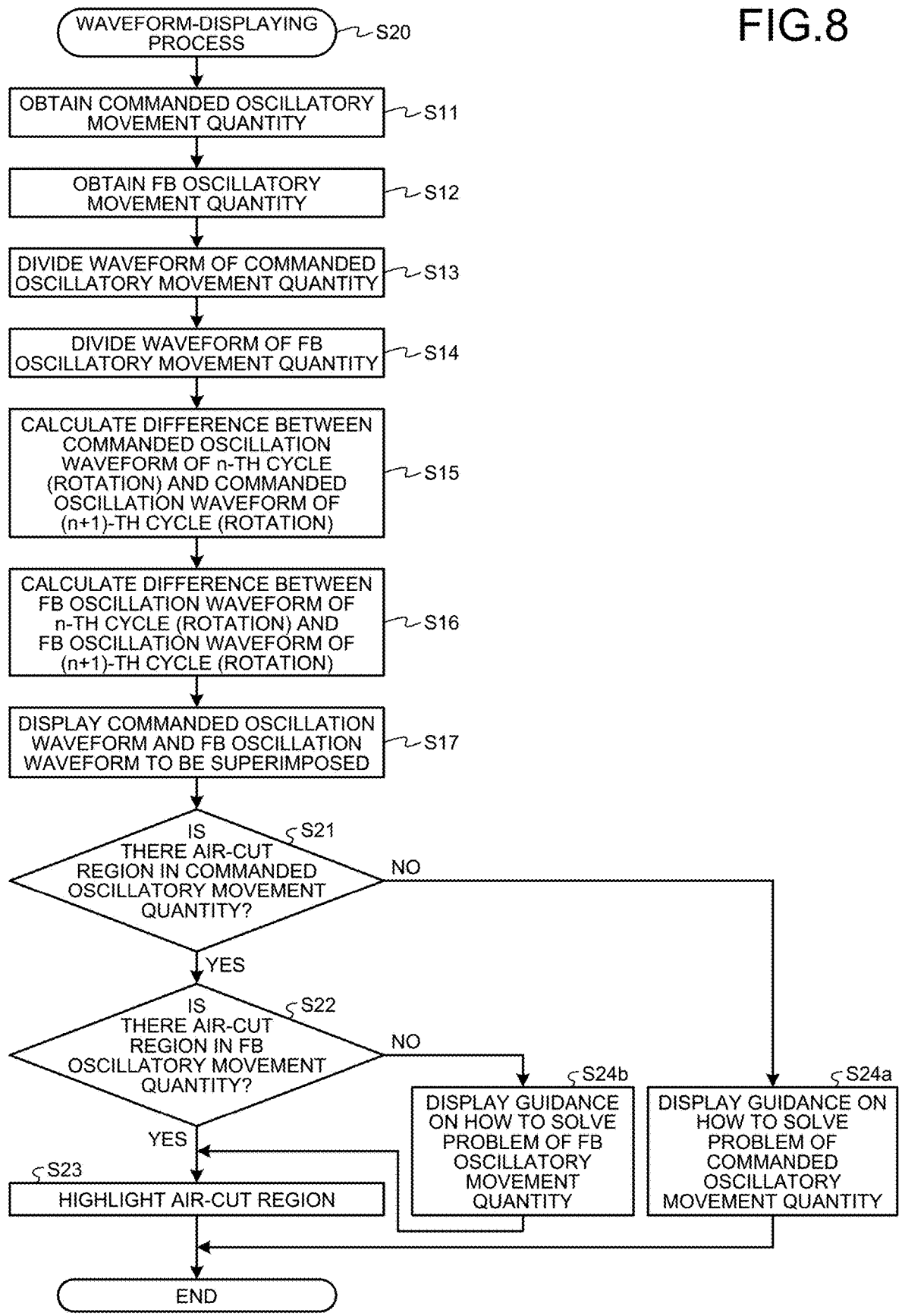

FIG.9B

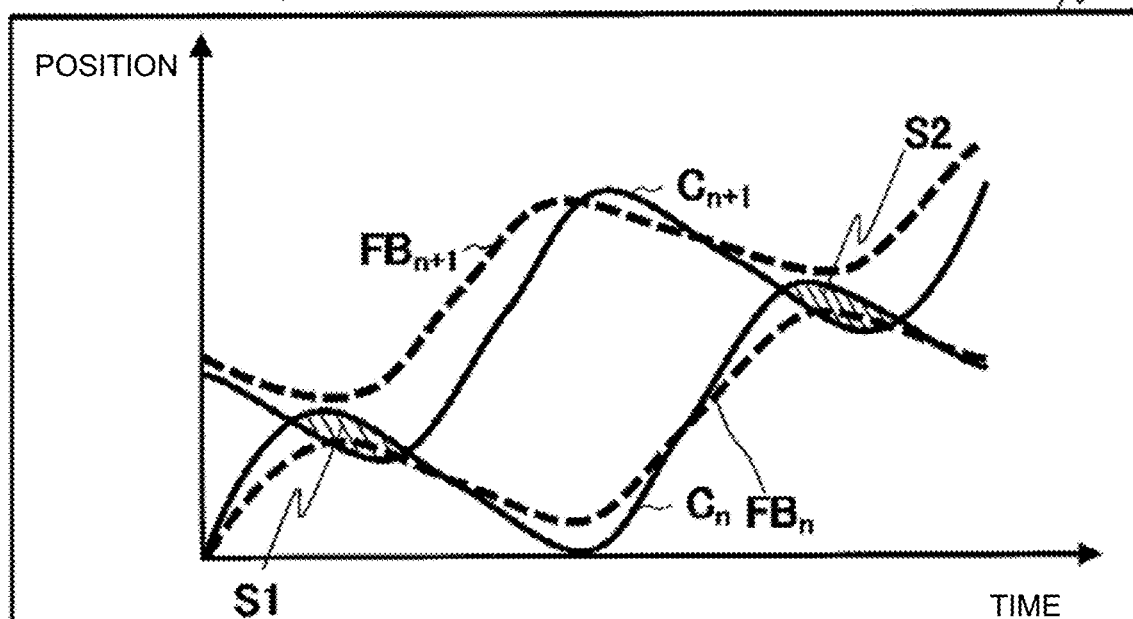

[GUIDANCE]
·THERE IS AN AIR-CUT REGION BETWEEN THE COMMANDED OSCILLATION WAVEFORMS. REVIEW THE OSCILLATION CONDITION TO INCREASE THE AMPLITUDE OF THE OSCILLATION CONDITION. AFTER REVIEWING, SEE IF AN AIR-CUT REGION APPEARS BETWEEN THE FB OSCILLATION WAVEFORMS. HOWEVER, IN CASE THE MACHINE TOOL VIBRATES SIGNIFICANTLY, TAKE ANOTHER ACTION.

·THERE IS AN AIR-CUT REGION BETWEEN THE COMMANDED OSCILLATION WAVEFORMS. REVIEW THE OSCILLATION CONDITION TO LOWER THE NUMBER OF CYCLES OF OSCILLATION OF THE OSCILLATION CONDITION. THE SERVOMOTOR MAY BE FAILING TO FOLLOW THE COMMAND. AFTER REVIEWING, SEE IF AN AIR-CUT REGION APPEARS BETWEEN THE FB OSCILLATION WAVEFORMS.

·THERE IS AN AIR-CUT REGION BETWEEN THE COMMANDED OSCILLATION WAVEFORMS. MAKE A REVIEW TO LOWER THE SPINDLE ROTATIONAL SPEED. THE SERVOMOTOR MAY BE FAILING TO FOLLOW THE COMMAND. AFTER REVIEWING, SEE IF AN AIR-CUT REGION APPEARS BETWEEN THE FB OSCILLATION WAVEFORMS.

·THERE IS AN AIR-CUT REGION BETWEEN THE COMMANDED OSCILLATION WAVEFORMS. REVIEW THE CONTROL PARAMETER(S) OF THE DRIVE UNIT TO INCREASE RESPONSIVENESS. THE SERVOMOTOR MAY BE FAILING TO FOLLOW THE COMMAND. AFTER REVIEWING, SEE IF AN AIR-CUT REGION APPEARS BETWEEN THE FB OSCILLATION WAVEFORMS. HOWEVER, IN CASE THE MACHINE TOOL VIBRATES SIGNIFICANTLY, TAKE ANOTHER ACTION.

FIG.11

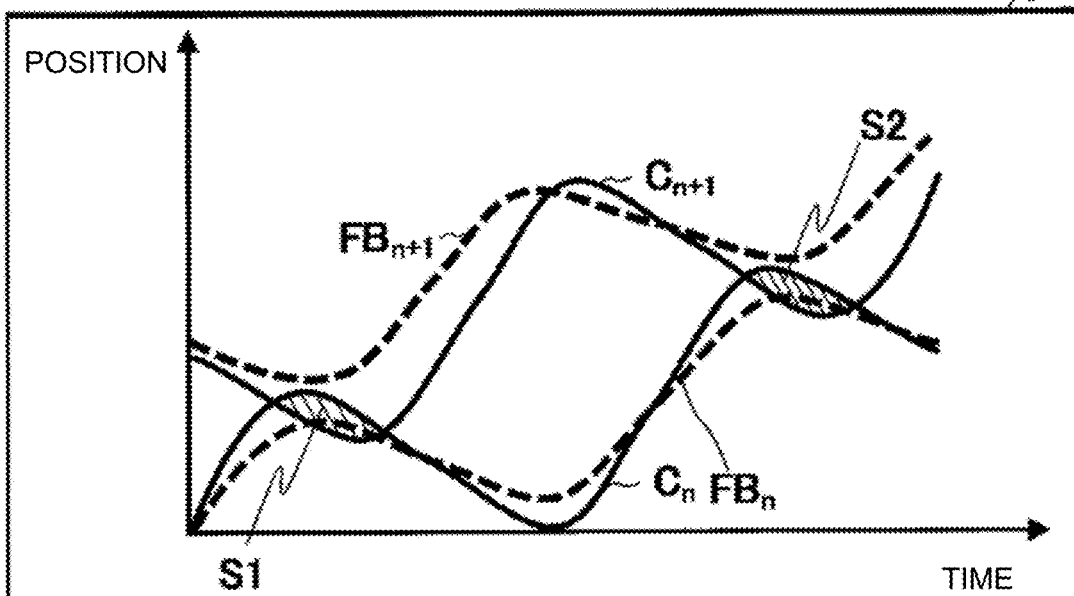

[GUIDANCE]
1. THERE IS AN AIR-CUT REGION BETWEEN THE COMMANDED OSCILLATION WAVEFORMS. REVIEW THE OSCILLATION CONDITION TO INCREASE THE AMPLITUDE OF THE OSCILLATION CONDITION. AFTER REVIEWING, SEE IF AN AIR-CUT REGION APPEARS BETWEEN THE FB OSCILLATION WAVEFORMS. NOTE, HOWEVER, THAT IN CASE THE MACHINE TOOL VIBRATES SIGNIFICANTLY, TAKE THE ACTION DESCRIBED NEXT.

2. THERE IS AN AIR-CUT REGION BETWEEN THE COMMANDED OSCILLATION WAVEFORMS. REVIEW THE CONTROL PARAMETER(S) OF THE DRIVE UNIT TO INCREASE RESPONSIVENESS. THE SERVOMOTOR MAY BE FAILING TO FOLLOW THE COMMAND. AFTER REVIEWING, SEE IF AN AIR-CUT REGION APPEARS BETWEEN THE FB OSCILLATION WAVEFORMS. NOTE, HOWEVER, THAT IN CASE THE MACHINE TOOL VIBRATES SIGNIFICANTLY, TAKE THE ACTION DESCRIBED NEXT.

3. THERE IS AN AIR-CUT REGION BETWEEN THE COMMANDED OSCILLATION WAVEFORMS. REVIEW THE OSCILLATION CONDITION TO LOWER THE NUMBER OF CYCLES OF OSCILLATION OF THE OSCILLATION CONDITION. THE SERVOMOTOR MAY BE FAILING TO FOLLOW THE COMMAND. AFTER REVIEWING, SEE IF AN AIR-CUT REGION APPEARS BETWEEN THE FB OSCILLATION WAVEFORMS. IF NO AIR-CUT REGION APPEARS, TAKE THE ACTION DESCRIBED NEXT.

4. THERE IS AN AIR-CUT REGION BETWEEN THE COMMANDED OSCILLATION WAVEFORMS. MAKE A REVIEW TO LOWER THE SPINDLE ROTATIONAL SPEED. THE SERVOMOTOR MAY BE FAILING TO FOLLOW THE COMMAND. AFTER REVIEWING, SEE IF AN AIR-CUT REGION APPEARS BETWEEN THE FB OSCILLATION WAVEFORMS.

NUMERICAL CONTROL DEVICE, MACHINE LEARNING DEVICE, AND NUMERICAL CONTROL METHOD

CROSS-REFERENCE TO RELATED APPLICATION

The present application is based on PCT filing PCT/JP2019/025560, filed Jun. 27, 2019, the entire contents of which are incorporated herein by reference.

FIELD

The present invention relates to a numerical control device that causes vibration cutting to be performed to machine a workpiece while causing the tool and the workpiece to move relative to each other to break chips; to a machine learning device; and to a numerical control method.

BACKGROUND

One conventionally known numerical control device of this type is, for example, a numerical control device that displays, on a display unit, an oscillation waveform using the horizontal axis representing the time period of one rotation of the spindle or the rotation angle during one rotation of the spindle, and using the vertical axis representing the positional command value or the actual position, of the feed shaft, such as the device described in Patent Literature 1. This enables the operator to easily determine whether chips are broken into small pieces in vibration cutting, that is, whether vibration cutting is successfully performed, by checking presence or absence of a portion where the oscillation waveform in a certain cycle and the oscillation waveform in the next cycle partly overlap each other.

CITATION LIST

Patent Literature

Patent Literature 1: Japanese Patent Application Laid-open No. 2018-195002

SUMMARY

Technical Problem

The numerical control device of Patent Literature 1 described above enables the operator to check whether vibration cutting is successfully performed. However, when vibration cutting is not successfully performed, the operator, in particular, an inexperienced operator, does not know what action to take to perform vibration cutting successfully, or otherwise needs to take an action based on the experience of the operator.

The present invention has been made in view of the foregoing, and it is an object of the present invention to provide a numerical control device, a machine learning device, and a numerical control method, capable of assisting in finding an action to take when vibration cutting is not successfully performed.

Solution to Problem

In order to achieve the object, according to the present invention in claim 1, a numerical control device outputs, to a drive shaft control unit that provides feedback control on a motor connected to a drive shaft provided on at least one of a tool or a workpiece, a vibration cutting command to machine the workpiece while causing the tool and the workpiece to move relative to each other, the feedback control being provided using a detector for detecting location information of the motor. The numerical control device includes: a first waveform dividing unit to perform a division of a waveform of a commanded oscillatory movement quantity specified by the vibration cutting command, into sections each corresponding to a unit time; a second waveform dividing unit to perform a division of a waveform of an actual position detected by the detector into sections each corresponding to the unit time; and a display control unit to display, on a display unit, an n-th commanded oscillation waveform, an (n+1)-th commanded oscillation waveform, an n-th actual position waveform, and an (n+1)-th actual position waveform being superimposed on one another along a time axis, n being a natural number, the n-th commanded oscillation waveform being an n-th waveform of the commanded oscillatory movement quantity produced by the division performed by the first waveform dividing unit, the (n+1)-th commanded oscillation waveform being an (n+1)-th waveform of the commanded oscillatory movement quantity produced by the division performed by the first waveform dividing unit, the n-th actual position waveform being an n-th waveform of the actual position produced by the division performed by the second waveform dividing unit, the (n+1)-th actual position waveform being an (n+1)-th waveform of the actual position produced by the division performed by the second waveform dividing unit.

Advantageous Effects of Invention

A numerical control device according to the present invention displays, on a display unit, an n-th commanded oscillation waveform, an (n+1)-th commanded oscillation waveform, an n-th actual position waveform, and an (n+1)-th actual position waveform, which is an (n+1)-th waveform of the actual position, being superimposed on one another along the time axis. This can assist the operator in guessing the cause when vibration cutting is not successfully performed.

BRIEF DESCRIPTION OF DRAWINGS

FIG. 5 is a flowchart illustrating an example of waveform-displaying process performed in the first embodiment.

FIG. 8 is a flowchart illustrating an example of guidance-displaying process performed by the numerical control system according to the second embodiment.

FIG. 9B is a diagram illustrating another example of display screen displayed by the guidance-displaying process of the second embodiment.

FIG. 11 is a diagram illustrating an example of display screen displayed in the third embodiment.

DESCRIPTION OF EMBODIMENTS

A numerical control system including a numerical control device, a machine learning device, and a numerical control method, according to embodiments of the present invention will be described in detail below with reference to the drawings. Note that these embodiments are not intended to limit the scope of this invention.

First Embodiment

Figure 1:
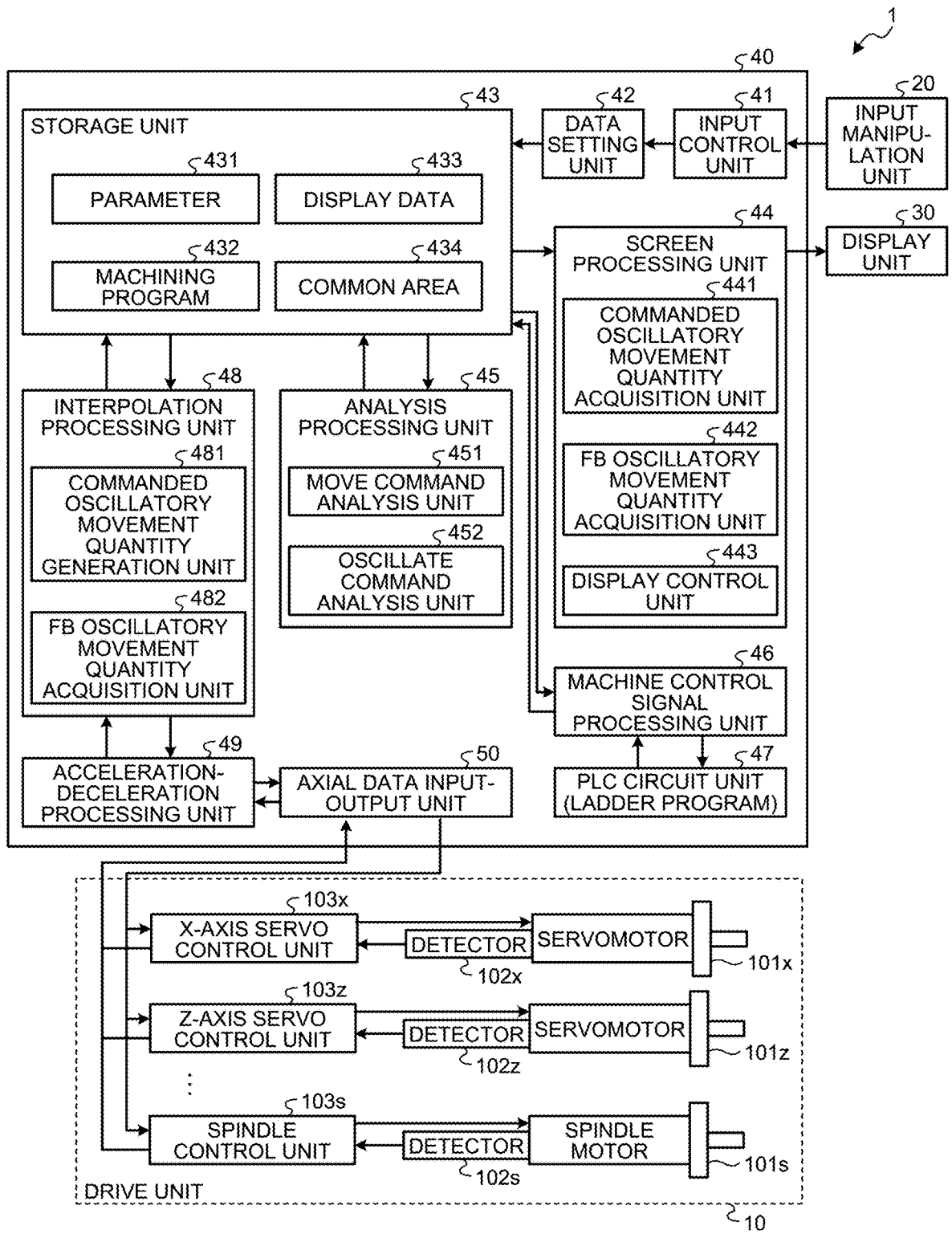
FIG. 1 is a block diagram illustrating an example of configuration of a numerical control system according to a first embodiment.

FIG. 1 is a block diagram illustrating an example of a numerical control (NC) system 1 including a numerical control device according to a first embodiment. As illustrated in this FIG. 1, the numerical control system 1 includes a drive unit 10, an input manipulation unit 20, a display unit 30, and a control computing unit 40. Note that the drive unit 10 and the control computing unit 40 respectively correspond to a drive shaft control unit and to a numerical control device.

The drive unit 10 is connected to the control computing unit 40. The drive unit 10 is a mechanism for driving at least one of a tool for machining a machined article, which is a workpiece to be machined by the machine tool, and the machined article. In the first embodiment, the drive unit 10 is, for example, a mechanism that drives the tool in two directions, i.e., a direction parallel to the X-axis direction and a direction parallel to the Z-axis direction while rotating the machined article to machine the machined article. Note that the first embodiment defines the central axis line of the machined article as the Z-axis, and the direction orthogonal to the Z-axis as the X-axis.

The drive unit 10 includes an X-axis servomotor 101x for moving the tool along the X-axis defined in the numerical control system 1, a detector 102x for detecting the position and the speed of this X-axis servomotor 101x, and an X-axis servo control unit 103x that provides feedback control (hereinafter also described as FB control) on the X-axis servomotor 101x based on a command (X-axis commanded oscillatory movement quantity, described later) from the numerical control system 1 and on location information and speed information detected by the detector 102x. The X-axis servo control unit 103x provides FB control on the X-axis servomotor 101x to cause an action of the tool in the X-axis direction. In addition, the drive unit 10 outputs the location information (i.e., actual position) detected by the detector 102x to the numerical control system 1 as an X-axis FB oscillatory movement quantity, which will be described later.

The drive unit 10 also includes a Z-axis servomotor 101z for moving the tool along the Z-axis defined in the numerical control system 1, a detector 102z for detecting the position and the speed of this Z-axis servomotor 101z, and a Z-axis servo control unit 103z that provides FB control on the Z-axis servomotor 101z based on a command (Z-axis commanded oscillatory movement quantity, described later) from the numerical control system 1 and on location information and speed information detected by the detector 102z. To achieve the Z-axis commanded oscillatory movement quantity output from the control computing unit 40, the Z-axis servo control unit 103z provides FB control on the Z-axis servomotor 101z to control the action of the tool in the Z-axis direction. In addition, the drive unit 10 outputs the location information (i.e., actual position) detected by the detector 102z to the numerical control system 1 as a Z-axis FB oscillatory movement quantity, which will be described later. The X-axis FB oscillatory movement quantity and the Z-axis FB oscillatory movement quantity will hereinafter also be collectively described simply as FB oscillatory movement quantity (or quantities).

The drive unit 10 further includes a spindle motor 101s for rotating the spindle that rotates the machined article, a detector 102s for detecting the position and the rotational speed of the spindle motor 101s, and a spindle control unit 103s that provides FB control on the spindle motor 101s based on a command from the numerical control system 1 and on location information and speed information detected by the detector 102s. The spindle control unit 103s provides FB control on the spindle motor 101s to control the rotational action of the machined article. Note that the rotational speed detected by the detector 102s corresponds to the rotational speed of the spindle motor 101s.

Note that this first embodiment assumes that the machine tool includes a single tool post, but there is no limitation on the number of tool posts, and multiple tool posts may be provided. In this case, the drive unit 10 can include, for each tool post, a pair of the X-axis servomotor 101x and the Z-axis servomotor 101z, a pair of the detectors 102x and 102z, a pair of the X-axis servo control unit 103x and the Z-axis servo control unit 103z, the spindle motor 101s, the detector 102s, and the spindle control unit 103s.

The input manipulation unit 20 is means for inputting information into the control computing unit 40, and includes input means such as, for example, a keyboard, a button, or a mouse. The input manipulation unit 20 receives, for example, an input of a command, an input of a machining program number, an input of a parameter relating to vibration cutting, and the like from the operator to the numerical control system 1, and outputs these inputs to the control computing unit 40.

The display unit 30 is means for displaying information from the control computing unit 40, and includes display means such as, for example, a liquid crystal display device. The display unit 30 displays information processed by the control computing unit 40 on a display screen. Note that although the first embodiment assumes that a liquid crystal display device is provided as the display unit 30, there is no limitation to this configuration. Another example may be that the numerical control system 1 is connected to a network, and a display device or a display device of a computer connected to that network is provided as the display unit.

The control computing unit 40 includes an input control unit 41, a data setting unit 42, a storage unit 43, a screen processing unit 44, an analysis processing unit 45, a machine control signal processing unit 46, a programmable logic controller (PLC) circuit unit 47, an interpolation processing unit 48, an acceleration-deceleration processing unit 49, and an axial data input-output unit 50. Note that this first embodiment assumes that the PLC circuit unit 47 is disposed inside the control computing unit 40, but the PLC circuit unit 47 may be disposed outside the control computing unit 40.

The input control unit 41 receives the information input from the input manipulation unit 20. The data setting unit 42 stores the information received by the input control unit 41, in the storage unit 43. That is, the input information received by the input manipulation unit 20 is written into the storage unit 43 via the input control unit 41 and via the data setting unit 42.

The storage unit 43 has a parameter storage area 431, a machining program storage area 432, a display data storage area 433, and a common area 434. The parameter storage area 431 stores parameters for use in processing of the control computing unit 40, specifically, control parameters for operation of the numerical control system 1, servo parameters, tool data, and parameters relating to vibration cutting. The machining program storage area 432 stores machining programs each including one or more blocks to be used in machining of a machined article. Note that this first embodiment assumes that a machining program includes a move command, which is a command to move the tool, a rotate command to rotate the spindle, and the like. The display data storage area 433 stores screen display data to be displayed on the display unit 30. The screen display data is data for displaying information on the display unit 30. The common area 434 stores data to be temporarily used by the control computing unit 40 for performing processing. For example, the machining program number received by the input manipulation unit 20 is written into the common area 434 of the storage unit 43 via the input control unit 41 and via the data setting unit 42.

The screen processing unit 44 includes a commanded oscillatory movement quantity acquisition unit 441, a FB oscillatory movement quantity acquisition unit 442, and a display control unit 443, and provides control to display the screen display data stored in the display data storage area 433 of the storage unit 43, on the display unit 30. Note that the components of the screen processing unit 44 will be described later.

The control computing unit 40 is configured such that the analysis processing unit 45, the machine control signal processing unit 46, and the interpolation processing unit 48 are connected to one another via the storage unit 43 to allow information to be written and information to be read via the storage unit 43. The following description may omit description that writing and reading information to and from the analysis processing unit 45, the machine control signal processing unit 46, and the interpolation processing unit 48 are performed via the storage unit 43.

The analysis processing unit 45 is connected to the storage unit 43. The analysis processing unit 45 refers to a machining program number written into the common area 434 of the storage unit 43. Upon reception of a selected machining program number stored in the common area 434 from the common area 434, the analysis processing unit 45 reads the selected machining program from the machining program storage area 432, and analyzes each block (each line) of the machining program. The analysis processing unit 45 analyzes an S code, which is a spindle motor rotational speed command; a G code, which is a command relating to an axial movement or the like; an M code, which is a machine function command; and the like. Upon completion of analysis of the lines of the machining program, the analysis processing unit 45 writes the results of analysis of the S code(s), the G code(s), the M code(s), and the like into the common area 434 of the storage unit 43.

In more detail, when the machining program includes an S code, the analysis processing unit 45 analyzes this S code to obtain the spindle rotational speed, which is the rotational speed of the spindle per unit time. The analysis processing unit 45 then writes this obtained spindle rotational speed into the common area 434 of the storage unit 43. Note that the first embodiment uses the time required for one rotation of the spindle as the unit time. In addition, when the machining program includes a G code, the analysis processing unit 45 analyzes this G code to obtain the movement condition, which is a condition of tool feed for causing the tool to move to the machining position. This movement condition is expressed by the speed of moving the tool post in the X-axis direction and in the Z-axis direction; the position to which the tool post is moved in the X-axis direction and in the Z-axis direction; and the like. The analysis processing unit 45 then writes this obtained movement condition into the common area 434 of the storage unit 43. Moreover, when the machining program includes a G code, the analysis processing unit 45 analyzes this G code to obtain the oscillation condition, which includes the frequency and the amplitude of generated oscillation of the tool. The analysis processing unit 45 then writes this obtained oscillation condition into the common area 434 of the storage unit 43. Note that, of the analysis processing unit 45, the unit that analyzes the movement condition included in the machining program is a move command analysis unit 451, and the unit that analyzes the oscillation condition included in the machining program is an oscillate command analysis unit 452. Note also that M codes are auxiliary commands that are commands other than commands for moving the drive shaft, i.e., the numerically controlled shaft, and are publicly known. Specific description thereof will therefore be omitted herein.

The machine control signal processing unit 46 is connected to the storage unit 43 and to the PLC circuit unit 47. When an auxiliary instruction such as an M code is written by the analysis processing unit 45 into the common area 434 of the storage unit 43, the machine control signal processing unit 46 reads this auxiliary instruction, and outputs this auxiliary instruction to the PLC circuit unit 47. In addition, upon reception of a completion signal indicating that machine control is complete from the PLC circuit unit 47, the machine control signal processing unit 46 writes a result indicating the completion of an auxiliary instruction such as an M code into the common area 434 of the storage unit 43. Signal information written by the machine control signal processing unit 46 into the common area 434 of the storage unit 43 is referred to by the interpolation processing unit 48 during machining operation.

The PLC circuit unit 47 is connected to the machine control signal processing unit 46, and stores ladder programs that describe machine operations to be performed by the PLC circuit unit 47, in a storage unit not illustrated. Upon reception of an auxiliary command such as an M code from the machine control signal processing unit 46, the PLC circuit unit 47 performs, on the machine tool, an operation corresponding to the auxiliary command according to a ladder program. In addition, the PLC circuit unit 47 outputs a completion signal indicating that machine control is complete to the machine control signal processing unit 46 after performing the operation corresponding to the auxiliary command.

The interpolation processing unit 48 is connected to the storage unit 43 and to the acceleration-deceleration processing unit 49. The interpolation processing unit 48 refers to the common area 434 of the storage unit 43, and when the analysis processing unit 45 writes the above movement condition and the above oscillation condition to the common area 434, the interpolation processing unit 48 reads the movement condition and the oscillation condition, and uses the movement condition and the oscillation condition that have been read to generate an X-axis commanded oscillatory movement quantity, which is a commanded oscillatory movement quantity in the X-axis direction, and to generate a Z-axis commanded oscillatory movement quantity, which is a commanded oscillatory movement quantity in the Z-axis direction. Note that the X-axis commanded oscillatory movement quantity and the Z-axis commanded oscillatory movement quantity will hereinafter also be collectively described simply as commanded oscillatory movement quantity (or quantities). The interpolation processing unit 48 writes these commanded oscillatory movement quantities generated into the common area 434 of the storage unit 43, and outputs these commanded oscillatory movement quantities to the acceleration-deceleration processing unit 49. In addition, upon obtaining FB oscillatory movement quantities from the acceleration-deceleration processing unit 49, the interpolation processing unit 48 writes the FB oscillatory movement quantities into the common area 434 of the storage unit 43. Note that, of the interpolation processing unit 48, the unit that generates the commanded oscillatory movement quantities using the movement condition and the oscillation condition is a commanded oscillatory movement quantity generation unit 481, and the unit that obtains the FB oscillatory movement quantities from the acceleration-deceleration processing unit 49 is a FB oscillatory movement quantity acquisition unit 482.

The acceleration-deceleration processing unit 49 is connected to the interpolation processing unit 48 and to the axial data input-output unit 50. The acceleration-deceleration processing unit 49 converts the commanded oscillatory movement quantities output from the interpolation processing unit 48 into a move command for a unit time taking into account acceleration and deceleration based on a pre-specified acceleration-deceleration pattern, and outputs this move command obtained by the conversion to the axial data input-output unit 50. The acceleration-deceleration processing unit 49 also outputs the FB oscillatory movement quantities output from the axial data input-output unit 50 to the interpolation processing unit 48.

The axial data input-output unit 50 is connected to the acceleration-deceleration processing unit 49 and to the drive unit 10. The axial data input-output unit 50 outputs the move command for a unit time output from the acceleration-deceleration processing unit 49, to the drive unit 10. The axial data input-output unit 50 also outputs FB oscillatory movement quantities output from the drive unit 10 to the acceleration-deceleration processing unit 49.

Figure 2A:
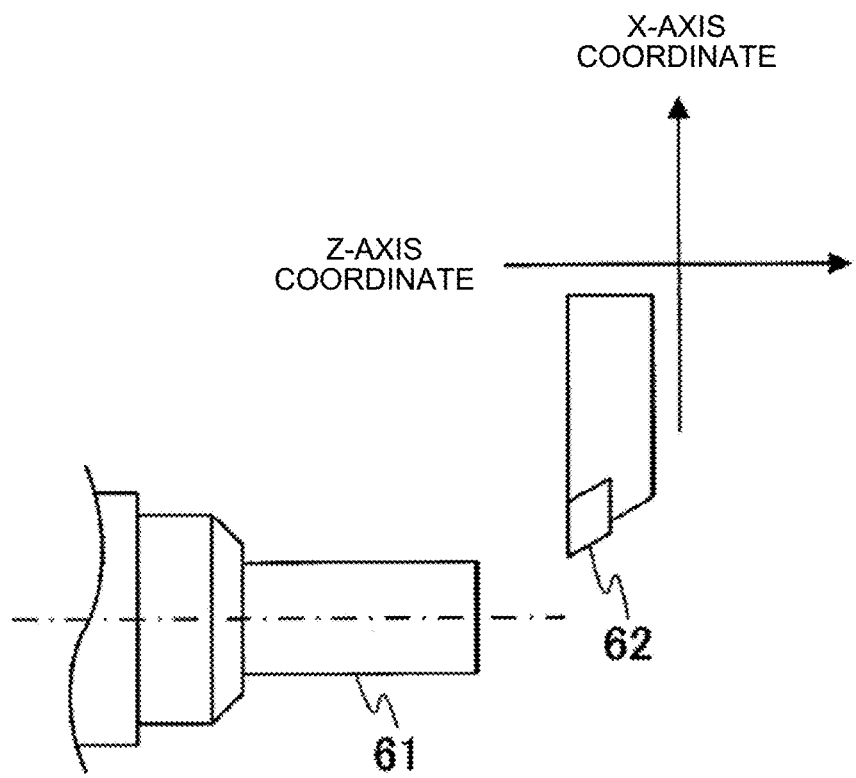
FIG. 2A is a view schematically illustrating a case in which the workpiece is stationary and only the tool is moved in the Z-axis direction and in the X-axis direction in the numerical control system according to the first embodiment.
Figure 2B:
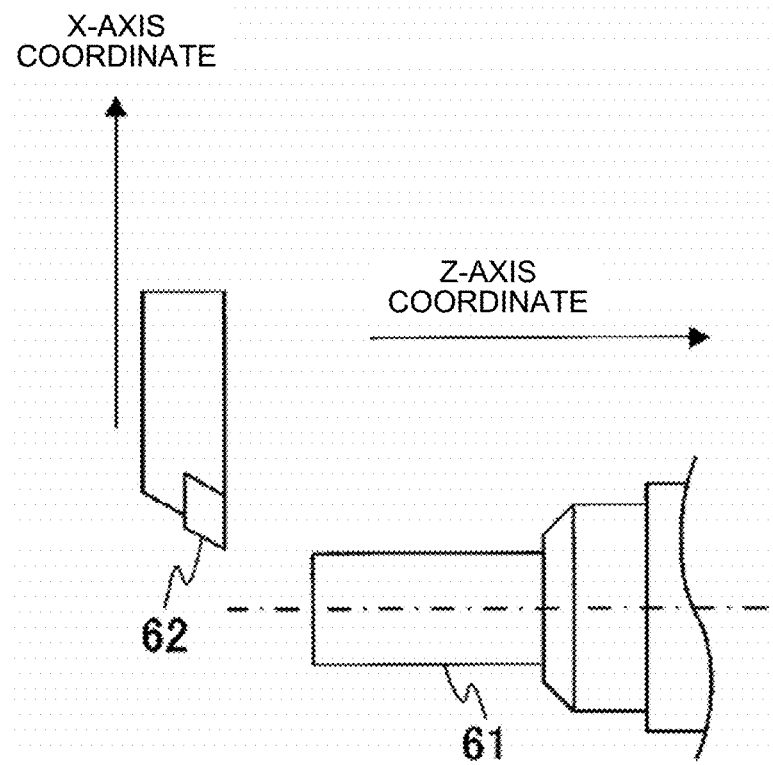
FIG. 2B is a view schematically illustrating a case in which the workpiece is moved in the Z-axis direction and the tool is moved in the X-axis direction in the numerical control system according to the first embodiment.

Machining while causing the tool or the workpiece to oscillate can be performed by moving the workpiece and the tool relative to each other during machining. FIGS. 2A and 2B are views schematically illustrating the configuration of the axes of the numerical control system 1 according to the first embodiment. In these FIGS. 2A and 2B, the Z-axis and the X-axis are perpendicular to each other on the plane of the paper. FIG. 2A illustrates a case in which a workpiece 61 is stationary, and only a tool 62, which is, for example, a turning machining tool for turning machining, is moved in the Z-axis direction and in the X-axis direction. FIG. 2B illustrates a case in which the workpiece 61 is moved in the Z-axis direction, and the tool 62 is moved in the X-axis direction. In both of these cases, providing a servomotor for each target to be moved will enable the following processing to be provided.

Figures 3, 4:
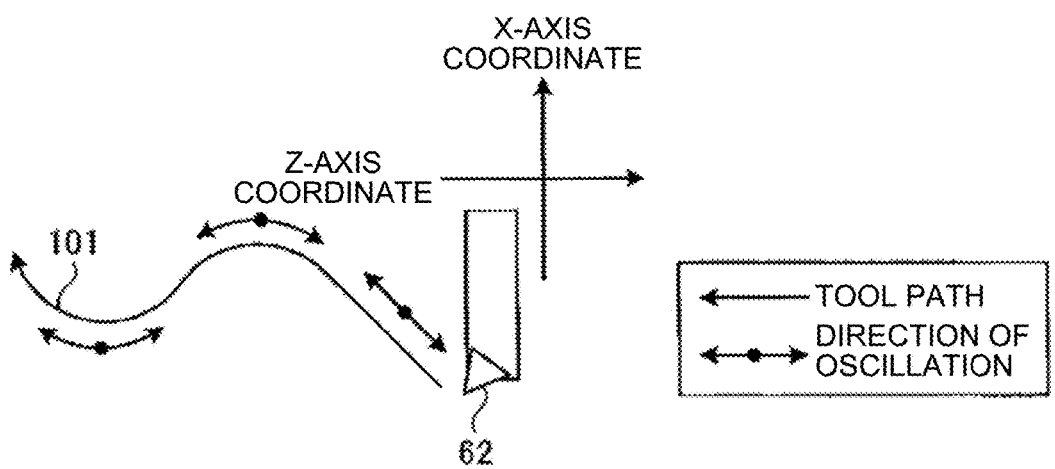
FIG. 3 is a diagram schematically illustrating a machining method of the first embodiment.
FIG. 4 is a diagram illustrating an example of machining program of the first embodiment.

FIG. 3 is a diagram schematically illustrating a machining method according to the first embodiment. A case is illustrated here in which the Z-axis and the X-axis are perpendicular to each other on the plane of the paper, and machining is performed while the tool 62 and the workpiece are moved relative to each other along a travel path 101 in this X-Z plane. In the first embodiment, the tool 62 is oscillated to follow the travel path 101 when the tool 62 is moved relatively to the workpiece along the travel path 101. That is, the tool 62 is oscillated to reciprocate along a line in a linear section, while the tool 62 is oscillated to reciprocate along a curved line in a curved section. Note that the description "the tool 62 is oscillated" refers to a relative motion of the tool 62 relative to the workpiece 61, and as illustrated in FIG. 2B, any one of the tool 62 and the workpiece 61 may be actually moved. This also applies to the following description.

FIG. 4 is a diagram illustrating an example of machining program according to the first embodiment. A machining program is read and executed line by line (block by block). The code "M3 S1000;" at line 401 of this machining program is an M code, and is a rotate command for the spindle. The code "G01 X10.0 Z20.0 F0.01;" at line 403 in the machining program is a G code, and is a command for linear interpolation. Similarly, the code "G02 X14.0 Z23.5 R4.0;" at line 404 in the machining program is a G code, and is a command for clockwise arc interpolation. These are all commands used in a typical numerical control device.

In addition, the code "G200 A0.03 D1.5;" at line 402 and the code "G201;" at line 405 are G codes, and are each a vibration cutting command that commands vibration cutting of the first embodiment. In this regard, the command "G200" specifies starting of vibration cutting, and the command "G201" specifies terminating of vibration cutting. In addition, "A" and the following numerical value specifies the amplitude (e.g., mm) of oscillation to generate, and "D" and the following numerical value specifies the number of cycles of oscillation per rotation (i.e., frequency) of the spindle. Note that this is merely by way of example, and the symbols for specifying starting and terminating of vibration cutting, the amplitude of oscillation to generate, and the number of cycles of oscillation per rotation of the spindle may be other symbols. The command values of the amplitude and of the number of cycles of oscillation per rotation of the spindle may also be any numerical values, but to cause accurate oscillation along a curved path and to allow chips generated by cutting to be broken into small pieces, very small oscillation (i.e., oscillation having an amplitude of several tens of micrometers or less, and having a corresponding frequency of several hundred Hz or lower) is typically commanded.

A waveform-displaying process performed by the numerical control system 1 configured as above will now be described with reference to FIG. 5. FIG. 5 is a flowchart illustrating an example of waveform-displaying process performed by the numerical control system 1 of the first embodiment.

A predetermined operation performed by an operator using the input manipulation unit 20 causes a waveform-displaying process S10 to be started. In more detail, the operator performs an operation of selecting which of the X-axis and Z-axis commanded oscillatory movement quantities and FB oscillatory movement quantities should be plotted along the vertical axis, and an operation of selecting which of the unit time and the rotation angle of the spindle should be plotted along the horizontal axis. The selection results are written into the common area 434 of the storage unit 43.

When the waveform-displaying process S10 is started, the commanded oscillatory movement quantity acquisition unit 441 of the screen processing unit 44 reads the above selection result written in the common area 434, and reads and thus obtains, from the common area 434, the commanded oscillatory movement quantity corresponding to the axis selected by the operator, of the X-axis commanded oscillatory movement quantity and the Z-axis commanded oscillatory movement quantity. The screen processing unit 44 then causes the process to proceed to the next step S12.

At step S12, the FB oscillatory movement quantity acquisition unit 442 of the screen processing unit 44 reads the above selection result written in the common area 434, and reads and thus obtains, from the common area 434, the FB oscillatory movement quantity corresponding to the axis selected by the operator, of the X-axis FB oscillatory movement quantity and the Z-axis FB oscillatory movement quantity. The screen processing unit 44 then causes the process to proceed to the next step S13.

At step S13, the display control unit 443 of the screen processing unit 44 divides the waveform of the commanded oscillatory movement quantity obtained at step S11. In more detail, in the case in which the operator has selected the unit time as the one to be represented by the horizontal axis, the display control unit 443 divides the waveform of the commanded oscillatory movement quantity obtained at step S11 into sections each corresponding to one cycle using the value of the frequency (i.e., period), which is an oscillation condition, to make the span from the left end of the horizontal axis to the right end of the horizontal axis represent the unit time, i.e., one period. Alternatively, in the case in which the operator has selected the rotation angle of the spindle as the one to be represented by the horizontal axis, the display control unit 443 divides the waveform of the commanded oscillatory movement quantity obtained in the operation at step S11 into sections each corresponding to one rotation of the spindle, using the rotate command for the spindle, to make the span from the left end of the horizontal axis to the right end of the horizontal axis represent one rotation of the spindle (i.e., 360 degrees). The display control unit 443 then causes the process to proceed to the next step S14. Note that, of the display control unit 443, the unit that divides the waveform of the commanded oscillatory movement quantity corresponds to a first waveform dividing unit and to a third waveform dividing unit, and the operation at step S13 corresponds to a first waveform dividing step and to a third waveform dividing step.

At step S14, the display control unit 443 of the screen processing unit 44 divides the waveform of the FB oscillatory movement quantity obtained at step S12. In more detail, in the case in which the operator has selected the unit time as the one to be represented by the horizontal axis, the display control unit 443 divides the waveform of the FB oscillatory movement quantity obtained at step S12 into sections each corresponding to one cycle using the value of the frequency (i.e., period), which is an oscillation condition, to make the span from the left end of the horizontal axis to the right end of the horizontal axis represent the unit time, i.e., one period. Alternatively, in the case in which the operator has selected the rotation angle of the spindle as the one to be represented by the horizontal axis, the display control unit 443 divides the waveform of the FB oscillatory movement quantity obtained in the operation at step S12 into sections each corresponding to one rotation of the spindle, using the rotate command for the spindle, to make the span from the left end of the horizontal axis to the right end of the horizontal axis represent one rotation of the spindle (i.e., 360 degrees). The display control unit 443 then causes the process to proceed to the next step S15. Note that, of the display control unit 443, the unit that divides the waveform of the FB oscillatory movement quantity corresponds to a second waveform dividing unit and to a fourth waveform dividing unit, and the operation at step S14 corresponds to a second waveform dividing step and to a fourth waveform dividing step.

At step S15, the display control unit 443 of the screen processing unit 44 calculates the difference between the commanded oscillatory movement quantity of the n-th cycle or of the n-th rotation and the commanded oscillatory movement quantity of the (n+1)-th cycle or of the (n+1)-th rotation, using the commanded oscillatory movement quantity produced by dividing at step S13.

In more detail, in the case in which the operator has selected the unit time as the one to be represented by the horizontal axis, the display control unit 443 calculates the difference in the commanded oscillatory movement quantity at time points corresponding to each other, between the n-th cycle commanded oscillation waveform, which is the waveform of the commanded oscillatory movement quantity of the n-th cycle, and the (n+1)-th cycle commanded oscillation waveform, which is the waveform of the commanded oscillatory movement quantity of the (n+1)-th cycle. Note that when this difference is greater than zero, that is, when the commanded oscillatory movement quantity at a corresponding time point in the n-th cycle is greater than the commanded oscillatory movement quantity at a corresponding time point in the (n+1)-th cycle, this means that a commanded oscillatory movement quantity that may allow chips to be broken during vibration cutting is being output to the drive unit 10.

Alternatively, when this difference is less than or equal to zero, that is, when the commanded oscillatory movement quantity at a corresponding time point in the n-th cycle is less than or equal to the commanded oscillatory movement quantity at a corresponding time point in the (n+1)-th cycle, this means that even a commanded oscillatory movement quantity that may allow chips to be broken during vibration cutting is not being output to the drive unit 10.

In addition, in the case in which the operator has selected the rotation angle of the spindle as the one to be represented by the horizontal axis, the display control unit 443 calculates the difference in the commanded oscillatory movement quantity, at rotation angles of the spindle corresponding to each other, between the n-th rotation commanded oscillation waveform, which is the waveform of the commanded oscillatory movement quantity of the n-th rotation, and the (n+1)-th rotation commanded oscillation waveform, which is the waveform of the commanded oscillatory movement quantity of the (n+1)-th rotation. Note that when this difference is greater than zero, that is, when the commanded oscillatory movement quantity at a corresponding rotation angle of the spindle in the n-th rotation is greater than the commanded oscillatory movement quantity at a corresponding rotation angle of the spindle in the (n+1)-th rotation, this means that a commanded oscillatory movement quantity that allows chips to be broken during vibration cutting is being output to the drive unit 10. Alternatively, when this difference is less than or equal to zero, that is, when the commanded oscillatory movement quantity at a corresponding rotation angle of the spindle in the n-th rotation is less than or equal to the commanded oscillatory movement quantity at a corresponding rotation angle of the spindle in the (n+1)-th rotation, this means that a commanded oscillatory movement quantity that allows chips to be broken during vibration cutting is not being output to the drive unit 10.

The display control unit 443 then causes the process to proceed to the next step S16. Note here that n is a natural number, and the value thereof is specified by the operator at the start of step S10. In addition, the region in which the above difference is greater than zero will be hereinafter described as air-cut region of a commanded oscillatory movement quantity. Moreover, the n-th cycle commanded oscillation waveform and the (n+1)-th cycle commanded oscillation waveform respectively correspond to an n-th commanded oscillation waveform and to an (n+1)-th commanded oscillation waveform.

At step S16, similarly to the operation at previous step S15, the display control unit 443 of the screen processing unit 44 calculates the difference between the FB oscillatory movement quantity of the n-th cycle or of the n-th rotation and the FB oscillatory movement quantity of the (n+1)-th cycle or of the (n+1)-th rotation, using the FB oscillatory movement quantity produced by dividing at step S14.

In more detail, in the case in which the operator has selected time as the one to be represented by the horizontal axis, the display control unit 443 calculates the difference in the FB oscillatory movement quantity at time points corresponding to each other, between the n- th cycle FB oscillation waveform, which is the waveform of the FB oscillatory movement quantity of the n-th cycle, and the (n+1)-th cycle FB oscillation waveform, which is the waveform of the FB oscillatory movement quantity of the (n+1)-th cycle. Note that when this difference is greater than zero, that is, when the FB oscillatory movement quantity at a corresponding time point in the n-th cycle is greater than the FB oscillatory movement quantity at a corresponding time point in the (n+1)-th cycle, this means that chips have actually been broken during vibration cutting. Alternatively, when this difference is less than or equal to zero, that is, when the FB oscillatory movement quantity at a corresponding time point in the n-th cycle is less than or equal to the FB oscillatory movement quantity at a corresponding time point in the (n+1)-th cycle, this means that chips have not been broken during vibration cutting.

In addition, in the case in which the operator has selected the rotation angle of the spindle as the one to be represented by the horizontal axis, the display control unit 443 calculates the difference in the FB oscillatory movement quantity at rotation angles corresponding to each other, between the n-th rotation FB oscillation waveform, which is the waveform of the FB oscillatory movement quantity of the n-th rotation, and the (n+1)-th rotation FB oscillation waveform, which is the waveform of the FB oscillatory movement quantity of the (n+1)-th rotation. Note that when this difference is greater than zero, that is, when the FB oscillatory movement quantity at a corresponding rotation angle of the spindle in the n-th rotation is greater than the FB oscillatory movement quantity at a corresponding rotation angle of the spindle in the (n+1)-th rotation, this means that chips have actually been broken during vibration cutting. Alternatively, when this difference is less than or equal to zero, that is, when the FB oscillatory movement quantity at a corresponding rotation angle of the spindle in the n-th rotation is less than or equal to the FB oscillatory movement quantity at a corresponding rotation angle of the spindle in the (n+1)-th rotation, this means that chips have not actually been broken during vibration cutting.

The display control unit 443 then causes the process to proceed to the next step S17. Note here that n is also a natural number, and the value thereof is specified by the operator at the start of step S10. In addition, the region in which the above difference is greater than zero will be hereinafter described as air-cut region of a FB oscillatory movement quantity. Moreover, the n-th cycle FB oscillation waveform and the (n+1)-th cycle FB oscillation waveform respectively correspond to an n-th actual position waveform and to an (n+1)-th actual position waveform.

At step S17, the display control unit 443 of the screen processing unit 44 generates screen display data using the commanded oscillatory movement quantity and the FB oscillatory movement quantity produced by dividing respectively at steps S13 and S14, writes the screen display data into the common area 434, and displays the screen display data on the display unit 30. In more detail, with the unit time represented by the horizontal axis, the display control unit 443 displays, on the display unit 30, the n-th cycle FB oscillation waveform and the (n+1)-th cycle FB oscillation waveform being superimposed respectively on the n-th cycle commanded oscillation waveform and on the (n+1)-th cycle commanded oscillation waveform. Alternatively, with the rotation angle during one rotation of the spindle represented by the horizontal axis, the display control unit 443 displays the waveforms of the FB oscillatory movement quantity of the n-th rotation and of the (n+1)-th rotation being superimposed respectively on the waveforms of the commanded oscillatory movement quantity of the n-th rotation and of the (n+1)-th rotation. The display control unit 443 then causes the process to proceed to the next step S18. Note that the operation at step S17 corresponds to a display control step.

At step S18, when the differences calculated at step S15 and at step S16 are greater than zero, the display control unit 443 of the screen processing unit 44 highlights these air-cut regions distinguishably from the other regions. In this first embodiment, an air-cut region is filled with a color such as, for example, green as an example of highlighting, but may be filled with another color, or may be colored transparent rather than being filled with a color. Any method may be used that allows distinction from the other regions. Note that the air-cut region formed by the n-th cycle commanded oscillation waveform and the (n+1)-th cycle commanded oscillation waveform corresponds to a first air-cut region, and the air-cut region formed by the n-th cycle FB oscillation waveform and the (n+1)-th cycle FB oscillation waveform corresponds to a second air-cut region. In addition, the air-cut region formed by the n-th rotation commanded oscillation waveform and the (n+1)-th rotation commanded oscillation waveform corresponds to a third air-cut region, and the air-cut region formed by the n-th rotation FB oscillation waveform and the (n+1)-th rotation FB oscillation waveform corresponds to a fourth air-cut region.

Figure 6A:
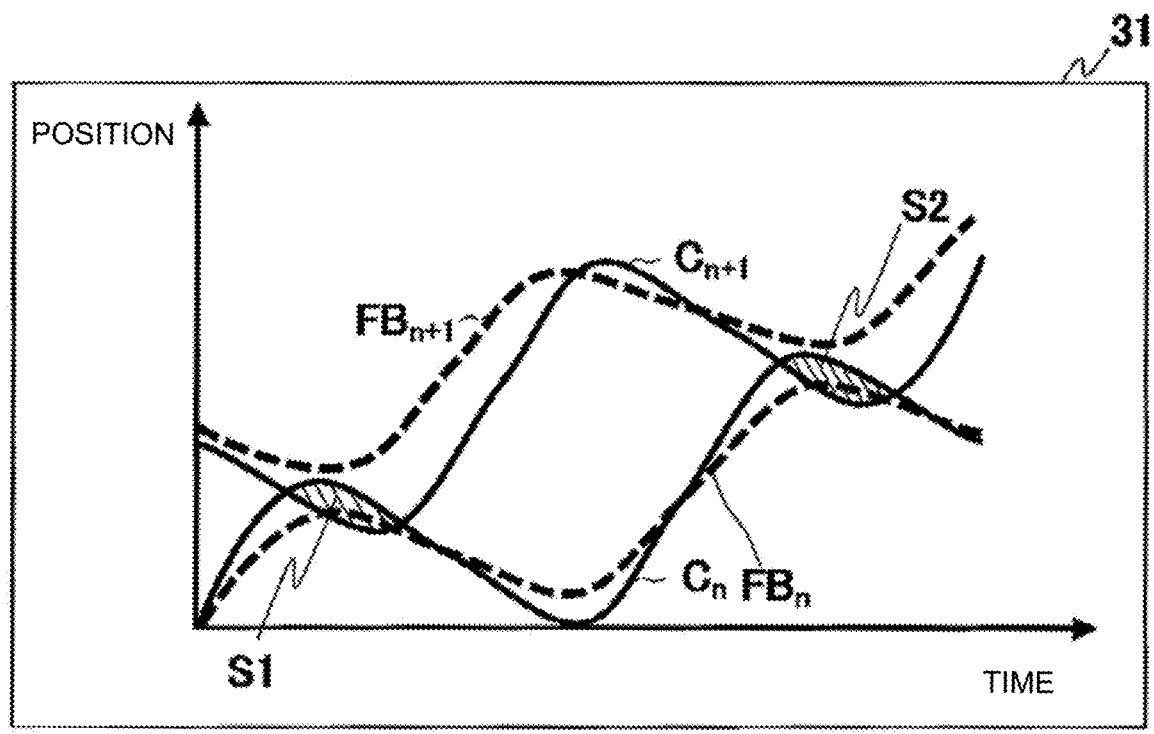
FIG. 6A is a diagram illustrating an example of display screen displayed by the waveform-displaying process of the first embodiment in a case in which an air-cut region appears only in the commanded oscillatory movement quantity.
Figure 6B:
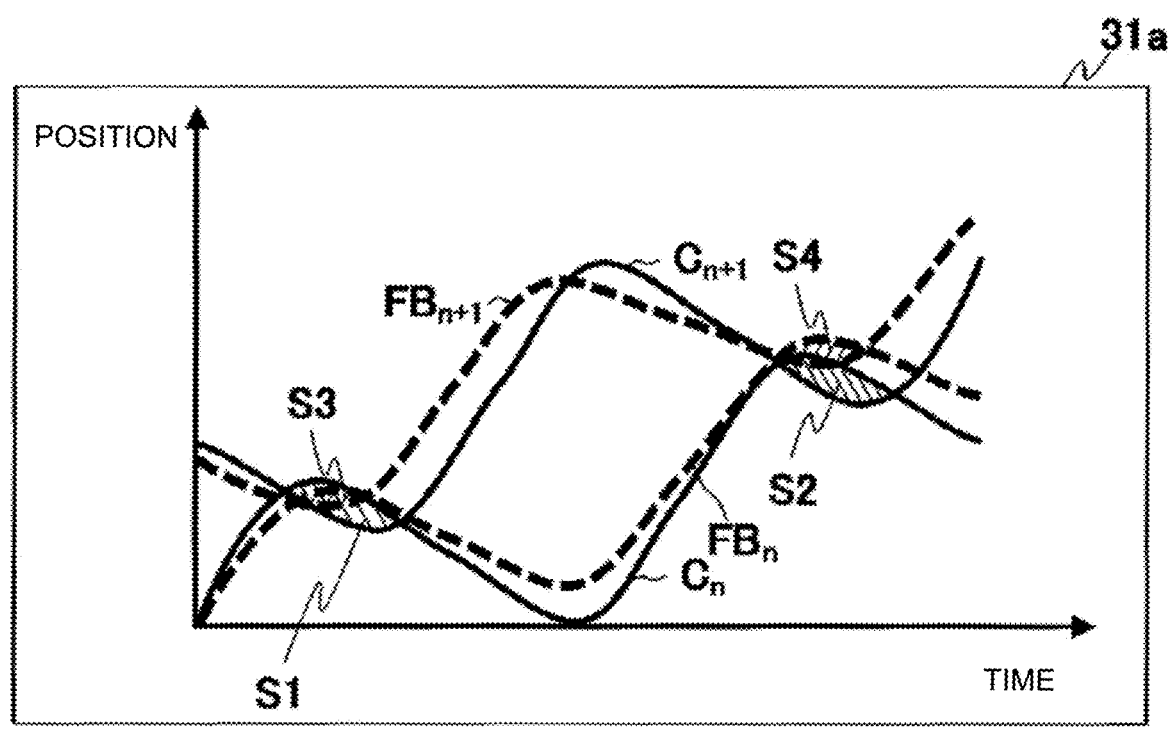
FIG. 6B is a diagram illustrating an example of display screen displayed by the waveform-displaying process of the first embodiment in a case in which an air-cut region appears both in the commanded oscillatory movement quantity and in the FB oscillatory movement quantity.

FIGS. 6A and 6B illustrate an example of display screens 31 and 31a displayed on the display unit 30 in the foregoing waveform-displaying process S10 performed by the numerical control system 1 of the first embodiment. Note that it is assumed here that, in the waveform-displaying process S10, the operator has selected the X-axis commanded oscillatory movement quantity and the X-axis FB oscillatory movement quantity to be plotted along the vertical axis, and the unit time to be plotted along the horizontal axis.

As illustrated in FIGS. 6A and 6B, the numerical control system 1 displays the waveforms of the X-axis commanded oscillatory movement quantity of the n-th cycle and of the (n+1)-th cycle using solid curved lines Cn and Cn+1, and displays the waveforms of the X-axis FB oscillatory movement quantity of the n-th cycle and of the (n+1)-th cycle using broken curved lines FBn and FBn+1. FIGS. 6A and 6B illustrate the curved lines Cn and Cn+1 as intersecting each other to form air-cut regions S1 and S2. Accordingly, the numerical control system 1 highlights these air-cut regions S1 and S2 distinguishably from the other regions. FIG. 6B illustrates the curved lines FBn and FBn+1 as intersecting each other to form air-cut regions S3 and S4. Accordingly, the numerical control system 1 highlights these air-cut regions S3 and S4 distinguishably from the other regions. Note that, for convenience of illustration, FIGS. 6A and 6B highlight the air-cut regions S1 to S4 by hatching.

In the example illustrated in FIG. 6A, the air-cut regions S1 and S2 appear between the waveforms of the commanded oscillatory movement quantity, while no air-cut region appears between the waveforms of the FB oscillatory movement quantity. That is, this indicates that, in the numerical control system 1, the control computing unit 40 is outputting, to the drive unit 10, a commanded oscillatory movement quantity that allows chips to be broken during vibration cutting, but in fact, chips are not broken during vibration cutting, meaning that vibration cutting is not successfully performed. Such display allows the operator to conceive an action to take on this, such as for example, to review the commanded oscillatory movement quantity, or to review the servo parameters of the X-axis servo control unit 103x.

In addition, in the example illustrated in FIG. 6B, the air-cut regions S1 and S2 appear between the waveforms of the commanded oscillatory movement quantity, and the air-cut regions S3 and S4 also appear between the waveforms of the FB oscillatory movement quantity. That is, this indicates that, in the numerical control system 1, the control computing unit 40 is outputting, to the drive unit 10, a commanded oscillatory movement quantity that allows chips to be broken during vibration cutting, thereby allowing chips to be broken during vibration cutting, meaning that vibration cutting is successfully performed.

The numerical control system 1 configured as described above uses the unit time as the one to be represented by the horizontal axis (i.e., time axis), and displays, on the display unit 30, the n-th cycle FB oscillation waveform and the (n+1)-th cycle FB oscillation waveform being superimposed respectively on the n-th cycle commanded oscillation waveform and on the (n+1)-th cycle commanded oscillation waveform; or alternatively, uses the rotation angle during one rotation of the spindle as the one to be represented by the horizontal axis, displays the n-th rotation FB oscillation waveform and the (n+1)-th rotation FB oscillation waveform being superimposed respectively on the n-th rotation commanded oscillation waveform and on the (n+1)-th rotation commanded oscillation waveform. This can assist the operator to find an action to take on this when vibration cutting is not successfully performed.

In addition, the numerical control system 1 highlights the command-based air-cut regions S1 and S2 distinguishably from the regions other than these air-cut regions S1 and S2, which are each a region in which the n-th cycle commanded oscillation waveform Cn is greater than the (n+1)-th cycle commanded oscillation waveform Cn+1, of the regions enclosed by the n-th cycle commanded oscillation waveform Cn and the (n+1)-th cycle commanded oscillation waveform Cn+1. Moreover, the numerical control system 1 highlights the machining-based air-cut regions S3 and S4 distinguishably from the regions other than these air-cut regions S3 and S4, which are each a region in which the n-th cycle FB oscillation waveform FBn is greater than the (n+1)-th cycle FB oscillation waveform FBn+1, of the regions enclosed by the n-th cycle FB oscillation waveform FBn and the (n+1)-th cycle FB oscillation waveform FBn+1. Furthermore, the numerical control system 1 highlights the command-based air-cut region(s) distinguishably from the regions other than this or these air-cut region(s), each of which is a region in which the n-th rotation commanded oscillation waveform is greater than the (n+1)-th rotation commanded oscillation waveform, of the regions enclosed by the n-th rotation commanded oscillation waveform and the (n+1)-th rotation commanded oscillation waveform. Still furthermore, the numerical control system 1 highlights the machining-based air-cut region(s) distinguishably from the regions other than this or these air-cut region(s), each of which is a region in which the n-th rotation FB oscillation waveform FBn is greater than the (n+1)-th rotation FB oscillation waveform FBn+1, of the regions enclosed by the n-th rotation FB oscillation waveform FBn and the (n+1)-th rotation FB oscillation waveform FBn+1. This enables the operator to determine presence or absence of an air-cut region more easily.

Figure 6C:
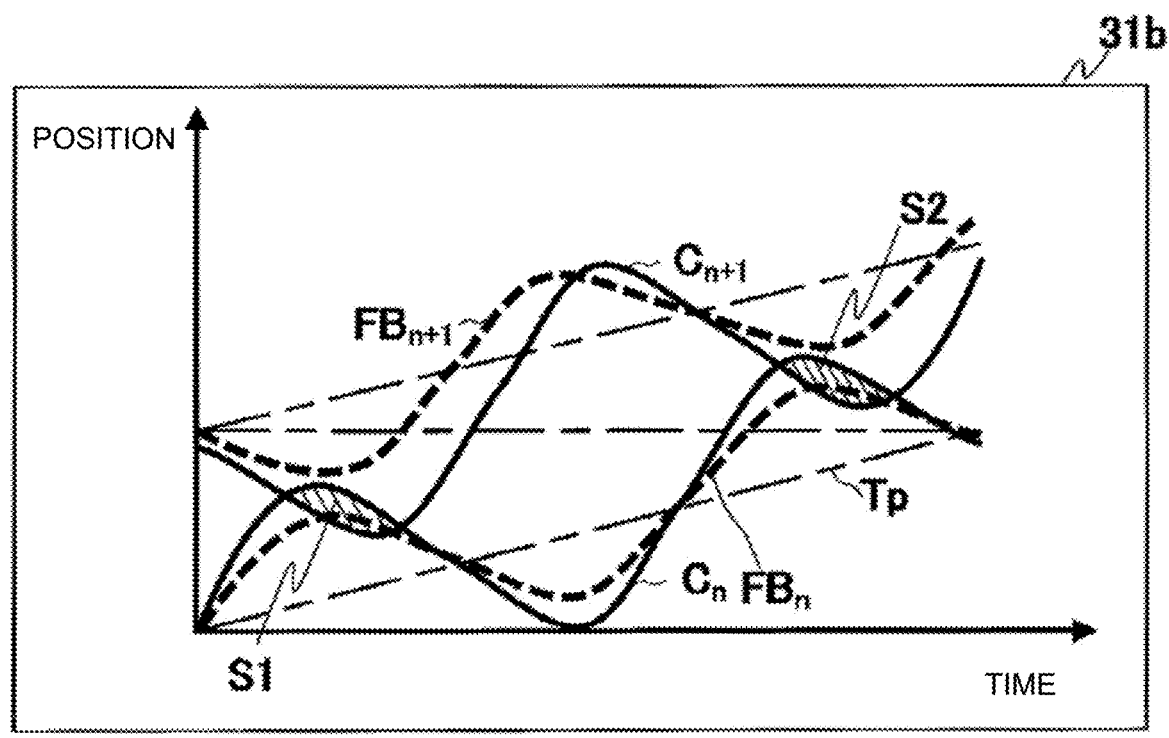
FIG. 6C is a diagram illustrating another example of display screen displayed by the waveform-displaying process of the first embodiment.

Note that the numerical control system 1 of the first embodiment displays the n-th cycle commanded oscillation waveform, the (n+1)-th cycle commanded oscillation waveform, the n-th cycle FB oscillation waveform, and the (n+1)-th cycle FB oscillation waveform to be superimposed on one another, or displays the n-th rotation commanded oscillation waveform, the (n+1)-th rotation commanded oscillation waveform, the n-th rotation FB oscillation waveform, and the (n+1)-th rotation FB oscillation waveform to be superimposed on one another. However, there is no limitation to this configuration. Another example may be to display a combination of a waveform of the cutting movement quantity of the tool of the n-th cycle and a waveform of the cutting movement quantity of the tool of the (n+1)-th cycle, or a combination of a waveform of the cutting movement quantity of the tool of the n-th rotation and a waveform of the cutting movement quantity of the tool of the (n+1)-th rotation, to be also superimposed. Specifically, as a diagram corresponding to the display screen 31 illustrated in FIG. 6A, a cutting movement quantity Tp of the tool may also be displayed and superimposed as indicated by the dashed-and-dotted lines in a display screen 31b illustrated in FIG. 6C. This can also provide an operational advantage similar to the operational advantage provided by the numerical control system 1 of the first embodiment. Note that the cutting movement quantity of the tool can be generated by calculation using the cutting command(s) described in the machining program. In addition, although the numerical control system 1 of the first embodiment highlights all the air-cut regions S1 to S4 in the display screen 31a illustrated in FIG. 6B, there is no limitation to this configuration. In the case of presence of the air-cut regions S3 and S4, the display may be such that the air-cut regions S3 and S4 are highlighted, while the air-cut regions S1 and S2 are not highlighted. This enables the operator to recognize the presence of the air-cut regions S3 and S4 more easily, which indicates that chips are broken during vibration cutting, meaning that vibration cutting is successfully performed.

Second Embodiment

Figure 7:
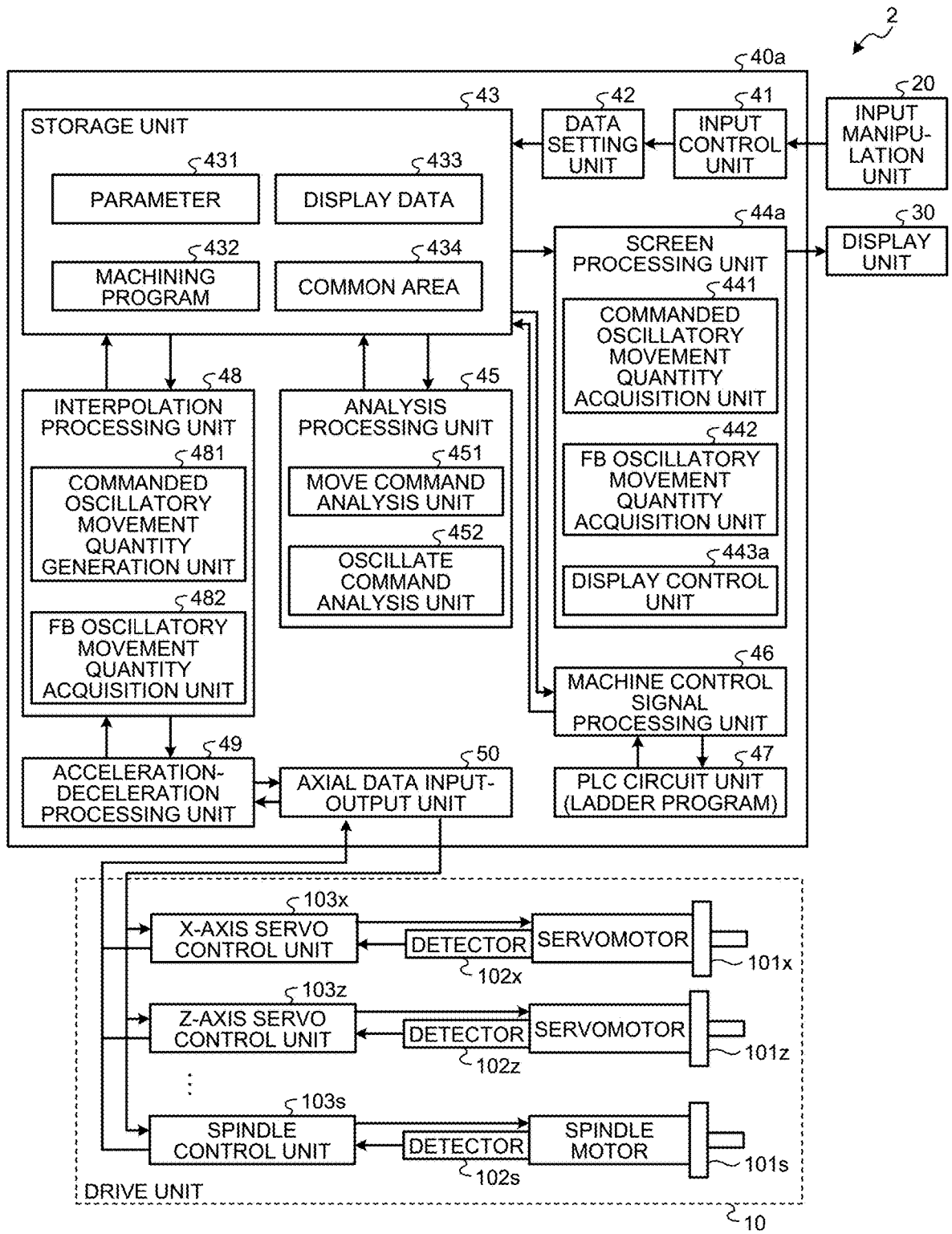
FIG. 7 is a block diagram illustrating an example of configuration of a numerical control system according to a second embodiment.
Figure 9A:
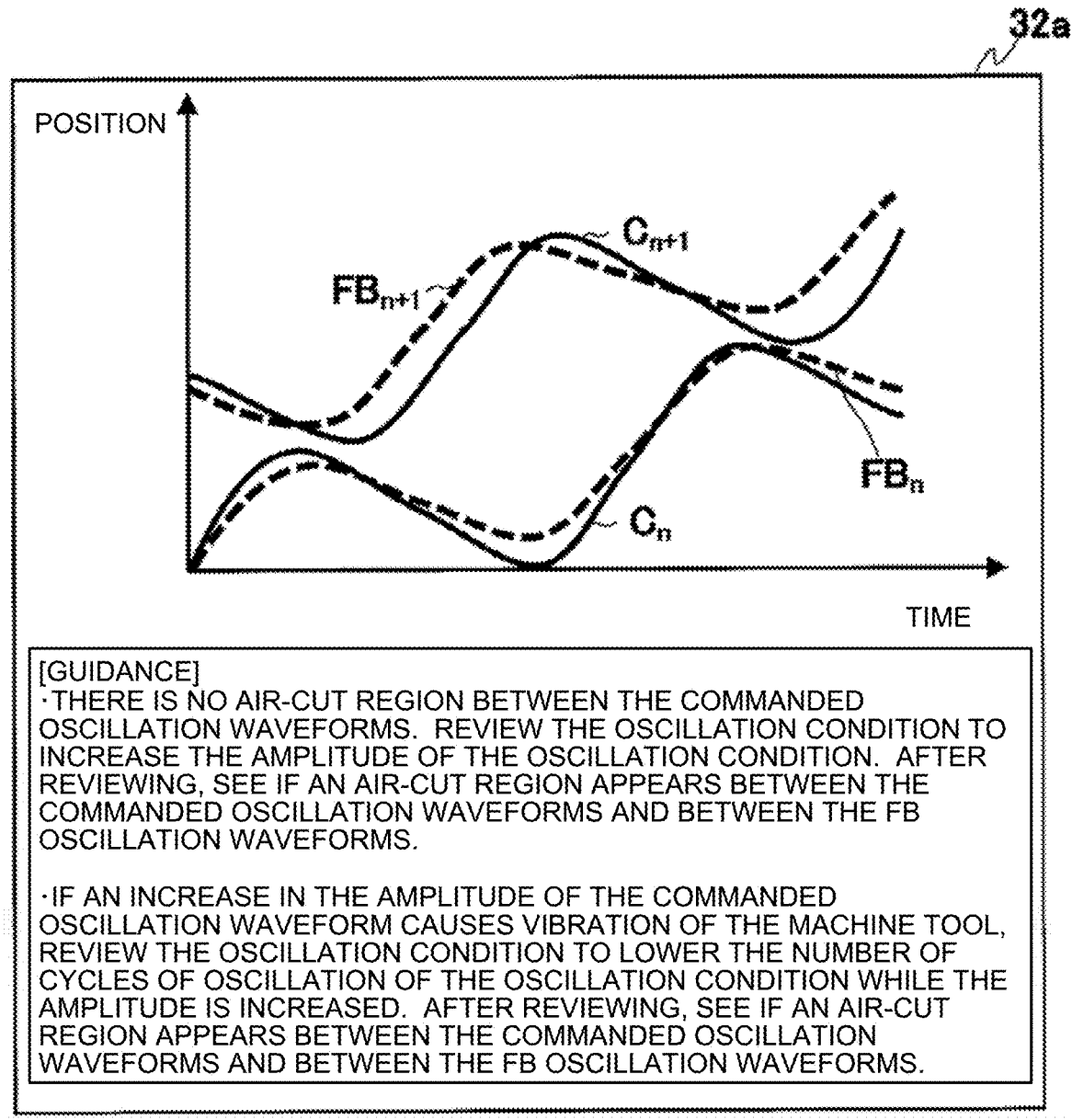
FIG. 9A is a diagram illustrating an example of display screen displayed by the guidance-displaying process of the second embodiment.

A numerical control system 2 including a numerical control device of a second embodiment will now be described with reference to FIGS. 7 to 9A and 9B. FIG. 7 is a block diagram illustrating an example of the numerical control system 2. FIG. 8 is a flowchart illustrating an example of guidance-displaying process performed by the numerical control system 2 of the second embodiment. FIGS. 9A and 9B are diagrams illustrating examples of respective display screens 32a and 32b displayed on the display unit 30 in a guidance-displaying process S20 performed by the numerical control system 2 of the second embodiment.

As illustrated in FIG. 7, the numerical control system 2 of the second embodiment is configured similarly to the numerical control system 1 of the first embodiment illustrated in FIG. 1. Duplicate description of the first embodiment will therefore be omitted. Note that the drive unit 10 and a control computing unit 40a respectively correspond to a drive shaft control unit and to a numerical control device.

As illustrated in FIG. 8, in the second embodiment, a display control unit 443a of a screen processing unit 44a performs steps S21 to S24b, in addition to steps S11 to S17 described above performed by the display control unit 443 of the first embodiment.

In more detail, after performing above-mentioned step S18, the display control unit 443a causes the process to proceed to step S21. At step S21, the display control unit 443a determines whether the difference calculated at above-mentioned step S15 is greater than zero. If the difference is greater than zero here, the display control unit 443a determines that there is an air-cut region ("Yes" at step S21), and causes the process to proceed to the next step S22. At step S22, the display control unit 443a determines whether the difference calculated at above-mentioned step S16 is greater than zero. If the difference is greater than zero here, the display control unit 443a determines that there is an air-cut region ("Yes" at step S22), and causes the process to proceed to the next step S23. At step S23, the display control unit 443a highlights these air-cut regions distinguishably from the other regions.

Otherwise, if it is determined that there is no command-based air-cut region with respect to the commanded oscillatory movement quantity in the operation at above-mentioned step S21 ("No" at step S21), the display control unit 443a causes the process to proceed to the next step S24a, and displays a guidance on how to solve the problem relating to the commanded oscillatory movement quantity. In more detail, absence of air-cut region in the commanded oscillation waveform indicates a small oscillation amplitude of the commanded oscillation waveform. Thus, as illustrated by an example of the display screen 32a in FIG. 9A, the display control unit 443a displays a guidance such as, for example, "There is no air-cut region between the commanded oscillation waveforms. Review the oscillation condition to increase the amplitude of the oscillation condition. After reviewing, see if an air-cut region appears between the commanded oscillation waveforms and between the FB oscillation waveforms.", and "If an increase in the amplitude of the commanded oscillation waveform causes vibration of the machine tool, review the oscillation condition to lower the number of cycles of oscillation (i.e., frequency) of the oscillation condition while the amplitude is increased. After reviewing, see if an air-cut region appears between the commanded oscillation waveforms and between the FB oscillation waveforms.". Note that the guidance displayed at step S24a corresponds to a first guidance and a third guidance.

In addition, if it is determined that there is no air-cut region with respect to the FB oscillatory movement quantity in the operation at above-mentioned step S22 ("No" at step S22), the display control unit 443a causes the process to proceed to the next step S24b, and displays a guidance on how to solve the problem relating to the FB oscillatory movement quantity. In more detail, absence of machining-based air-cut region between the FB oscillation waveforms even though a command-based air-cut region is present between the commanded oscillation waveforms indicates a small oscillation amplitude of the FB oscillation waveform due to failure in following the commanded oscillation waveform. Thus, as illustrated by the example of the display screen 32b in FIG. 9B, the display control unit 443a displays a guidance such as, for example, "There is an air-cut region between the commanded oscillation waveforms. Review the oscillation condition to increase the amplitude of the oscillation condition. After reviewing, see if an air-cut region appears between the FB oscillation waveforms. However, in case the machine tool vibrates significantly, take another action.", "There is an air-cut region between the commanded oscillation waveforms. Review the oscillation condition to lower the number of cycles of oscillation (i.e., frequency) of the oscillation condition. The servomotor may be failing to follow the command. After reviewing, see if an air-cut region appears between the FB oscillation waveforms.", "There is an air-cut region between the commanded oscillation waveforms. Make a review to lower the spindle rotational speed. The servomotor may be failing to follow the command. After reviewing, see if an air-cut region appears between the FB oscillation waveforms.", and "There is an air-cut region between the commanded oscillation waveforms. Review the control parameter(s) of the drive unit to increase responsiveness. The servomotor may be failing to follow the command. After reviewing, see if an air-cut region appears between the FB oscillation waveforms. However, in case the machine tool vibrates significantly, take another action.". Note that the guidance displayed at step S24b corresponds to a second guidance and a fourth guidance.

The numerical control system 2 of the second embodiment that has been described displays a guidance for allowing an air-cut region to appear when there is no command-based air-cut region between the commanded oscillation waveforms, and displays a guidance for allowing an air-cut region to appear when there is a command-based air-cut region between the commanded oscillation waveforms, but there is no machining-based air-cut region between the FB oscillation waveforms. Display of a guidance for allowing an air-cut region to appear enables even an inexperienced operator to easily take an action on the situation in which vibration cutting is not successfully performed, by seeing what is displayed in the guidance.

Note that the description has been made to an example in which a guidance for allowing an air-cut region to appear is displayed when there is an air-cut region between the commanded oscillation waveforms, but there is no air-cut region between the FB oscillation waveforms. However, the numerical control system 2 of the second embodiment may display a guidance for allowing an air-cut region to appear when there is no air-cut region between the FB oscillation waveforms regardless of whether there is an air-cut region between the commanded oscillation waveforms. This operation can also provide an operational advantage similar to the operational advantage of the numerical control system 2 of the second embodiment. In addition, a guidance may be displayed also when there is no command-based air-cut region between the command-based air-cut regions, but there is a machining-based air-cut region between the FB oscillation waveforms. The situation in which there is no command-based air-cut region between the command-based air-cut regions, but there is a machining-based air-cut region between the FB oscillation waveforms may result from overresponse of the servomotor. Such situation needs to be solved by lowering of the value of a control parameter (servo gain) of the servomotor. This idea may be displayed in the guidance. This operation can also provide an operational advantage similar to the operational advantage of the numerical control system 2 of the second embodiment.

Third Embodiment

Figure 10:
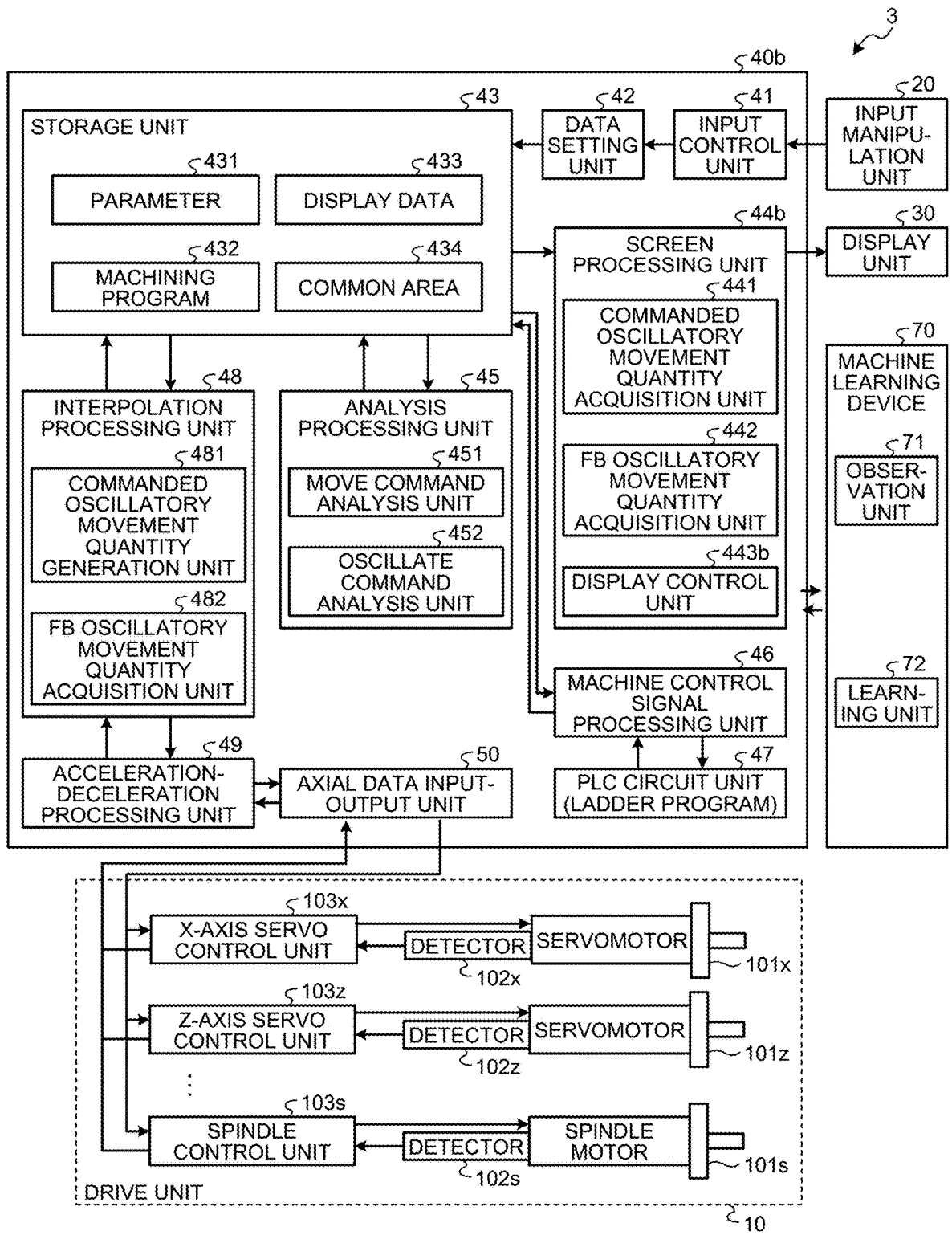
FIG. 10 is a block diagram illustrating an example of configuration of a numerical control system according to a third embodiment.

A numerical control system 3 including a numerical control device of a third embodiment will now be described with reference to FIG. 10. FIG. 10 is a block diagram illustrating an example of the numerical control system 3.

As illustrated in FIG. 10, the numerical control system 3 of the third embodiment is configured similarly to the numerical control system 1 of the first embodiment illustrated in FIG. 1 and to the numerical control system 2 of the second embodiment illustrated in FIG. 7. Duplicate description of the first embodiment and of the second embodiment will therefore be omitted.

As illustrated in FIG. 10, the numerical control system 3 includes a machine learning device 70. The machine learning device 70 is connected to a control computing unit 40*b*, and includes an observation unit 71 and a learning unit 72.

The machine learning device 70 predicts guidance information (n), which provides an action for the situation in which vibration cutting is not successfully performed (that is, when chips are not broken), using information (r) on the first air-cut region or on the third air-cut region formed by the foregoing commanded oscillation waveform, information (r) on the second air-cut region or on the fourth air-cut region formed by the foregoing FB oscillation waveform, and modification information (r) of various parameters that have been changed when the second air-cut region or the fourth air-cut region did not appear. Note that the modification information (r) of various parameters includes operator modification information (r), which is information indicating that various parameters have been changed, and parameter modification information (r), which is information about how those parameters have been changed. In addition, various parameters include at least one of: modification information about a servo parameter (i.e., servo gain), modification information about the oscillate command (i.e., foregoing oscillation condition), modification information about the spindle rotational speed, and the like, which is likely to be changed by the operator in the action when the second air-cut region or the fourth air-cut region did not appear. Note that information including the foregoing information (r) on the first air-cut region or on the third air-cut region, the foregoing information (r) on the second air-cut region or on the fourth air-cut region, and the foregoing modification information (r) of various parameters being associated with one another will also be referred to hereinafter as state information (i). Note also that a state variable (i) corresponds to first through fourth state variables.

The observation unit 71 outputs the state information (i), which is the result of data observation, to the learning unit 72. In more detail, triggered by the foregoing operator modification information (r), the observation unit 71 observes the foregoing information (r) on the first air-cut region or on the third air-cut region, the foregoing information (r) on the second air-cut region or on the fourth air-cut region, and the foregoing modification information (r) of various parameters, together with the foregoing operator modification information (r), and outputs the foregoing state information (i) to the learning unit 72.

The learning unit 72 learns the state information (i) output from the observation unit 71 as the state variable to predict guidance information (n), which provides an action for the situation in which vibration cutting is not successfully performed (that is, when chips are not broken).

In more detail, in the third embodiment, the learning unit 72 learns from the foregoing state information (i) using, for example, so-called supervised learning according to a neural network model, and outputs the guidance information (n) as the learning result (prediction value). In this regard, supervised learning refers to a model that, given a large number of data pairs of a certain input and a result to a learning unit, learns a feature of the dataset thereof, and estimates a result from the input. A neural network includes an input layer consisting of multiple neurons, a middle layer (hidden layer) consisting of multiple neurons, and an output layer consisting of multiple neurons. The middle layer may include a single layer or two or more layers. For example, a three-layer neural network operates such that multiple inputs are input to the input layer, the values of the inputs are weighted, the weighted values are input to the middle layer, the resulting values are further weighted, and the weighted values are output from the output layer. This output result varies depending on the values of the weights. That is, the learning unit 72, including a neural network, adjusts the weights of the neural network using the state information (i), and outputs the guidance information (n) to the control computing unit 40*b* as the learning result (prediction value).

FIG. 11 illustrates an example of a display screen 33 displayed in the third embodiment, corresponding to the display screen 32*b* displayed in the second embodiment. The following description will be provided with reference to this FIG. 11. Upon output of the guidance information (n) from the machine learning device 70 as the learning result, a display control unit 443*b* of the control computing unit 40*b* displays a guidance to provide accurate solutions, for example, in the order from a first probable one to a fourth probable one as illustrated by an example of the display screen 33 in FIG. 11.

In more detail, the display control unit 443*b* displays a guidance to provide accurate solutions in the order from the first priority to the fourth priority, such as for example, "There is an air-cut region between the commanded oscillation waveforms. Review the oscillation condition to increase the amplitude of the oscillation condition. After reviewing, see if an air-cut region appears between the FB oscillation waveforms. Note, however, that in case the machine tool vibrates significantly, take the action described next.", "There is an air-cut region between the commanded oscillation waveforms. Review the control parameter(s) of the drive unit to increase responsiveness. The servomotor may be failing to follow the command. After reviewing, see if an air-cut region appears between the FB oscillation waveforms. Note, however, that in case the machine tool vibrates significantly, take the action described next.", "There is an air-cut region between the commanded oscillation waveforms. Review the oscillation condition to lower the number of cycles of oscillation (i.e., frequency) of the oscillation condition. The servomotor may be failing to follow the command. After reviewing, see if an air-cut region appears between the FB oscillation waveforms. If no air-cut region appears, take the action described next.", and "There is an air-cut region between the commanded oscillation waveforms. Make a review to lower the spindle rotational speed. The servomotor may be failing to follow the command. After reviewing, see if an air-cut region appears between the FB oscillation waveforms.". This enables even an inexperienced operator to easily take an accurate action on the situation in which vibration cutting is not successfully performed.

Note that, in the third embodiment, the learning unit 72 learns the guidance information (n) using so-called supervised learning, but is not limited to having this configuration. Another example may be that the learning unit 72 learns the guidance information (n) using so-called unsupervised learning. In this regard, unsupervised learning is a technique in which only a large amount of input data is given to the machine learning device 70, which then learns how the input data is distributed, and thus learns a device that performs compression, classification, shaping, and/or the like on the input data without being given corresponding labeled training output data. For example, these datasets can be grouped into clusters each including datasets having similar features. Assigning outputs to optimize a certain criterion using this result enables the output to be predicted.

In addition, in the third embodiment (including the variations), the learning unit 72 learns the guidance information (n) based on a dataset generated for a single control computing unit 40b, and outputs the guidance information (n) as the learning result (prediction value), but the learning unit 72 is not limited to having this configuration. The learning unit 72 may learn the guidance information (n) based on datasets generated for multiple control computing units 40b, and output the guidance information (n) as the learning result (prediction value). As other examples, the learning unit 72 may obtain datasets from multiple control computing units 40b used on the same site, or may use datasets collected from the control computing units 40b of multiple respective machine tools independently operating on different sites. Moreover, the control computing unit 40b that collects a dataset may be added as a learning target, or removed from the set of learning targets, during learning. Furthermore, the machine learning device 70 that has learned about a certain control computing unit 40b may be connected to another control computing unit 40b to re-learn information about the vibration cutting described above performed by the another control computing unit 40b, and to update the learning result (prediction value) of the guidance information (n). In addition, the learning algorithm used in the learning unit 72 may be deep learning, which learns extraction of a characteristic quantity itself, or machine learning may be performed using another known method such as, for example, genetic programming, functional logic programming, or support-vector machine.

Note that the machine learning device 70 may be installed, for example, in a server or the like such that the control computing unit 40b and the machine learning device 70 are connected to each other using wired communication, or the machine learning device 70 may be installed, for example, in a cloud server or the like such that the control computing unit 40b and the machine learning device 70 are connected to each other using wireless communication. Alternatively, instead of using the control computing unit 40b and the machine learning device 70 that are separate components, the machine learning device 70 may be configured to be included in the control computing unit 40b.

The configurations described in the foregoing embodiments are merely examples of various aspects of the present invention. These configurations may be combined with a known other technology, and moreover, a part of such configurations may be omitted and/or modified without departing from the spirit of the present invention.

INDUSTRIAL APPLICABILITY

The present invention is suitable for providing a numerical control device and a numerical control method for performing vibration cutting to machine a workpiece while causing the tool and the workpiece to move relative to each other to break chips.

REFERENCE SIGNS LIST 1, 2, 3 numerical control system; 10 drive unit; 20 input manipulation unit; 30 display unit; 31, 31a, 31b, 32, 32a, 33 display screen; 40, 40a, 40b control computing unit; 41 input control unit; 42 data setting unit; 43 storage unit; 44, 44a, 44b screen processing unit; 45 analysis processing unit; 46 machine control signal processing unit; 47 PLC circuit unit; 48 interpolation processing unit; 49 acceleration-deceleration processing unit; 50 axial data input-output unit; 61 workpiece; 62 tool; 70 machine learning device; 71 observation unit; 72 learning unit; 101x X-axis servomotor; 101z Z-axis servomotor; 101s spindle motor; 102x, 102z, 102s detector; 103x X-axis servo control unit; 103z Z-axis servo control unit; 103s spindle control unit; 431 parameter storage area; 432 machining program storage area; 433 display data storage area; 434 common area; 441 commanded oscillatory movement quantity acquisition unit; 442 FB oscillatory movement quantity acquisition unit; 443, 443a, 443b display control unit; 451 move command analysis unit; 452 oscillate command analysis unit; 481 commanded oscillatory movement quantity generation unit; 482 FB oscillatory movement quantity acquisition unit.

The invention claimed is:

1. A numerical control device that outputs, to a drive shaft controller that provides feedback control on a motor connected to a drive shaft provided on at least one of a tool or a workpiece, a vibration cutting command to machine the workpiece while causing the tool and the workpiece to move relative to each other, the feedback control being provided using a detector for detecting location information of the motor, the numerical control device comprising:
 a first waveform divider to perform a division of a waveform of a commanded oscillatory movement quantity specified by the vibration cutting command, into sections each corresponding to a unit time;
 a second waveform divider to perform a division of a waveform of an actual position detected by the detector into sections each corresponding to the unit time; and
 a display controller to display, on a display, an n-th commanded oscillation waveform, an (n+1)-th commanded oscillation waveform, an n-th actual position waveform, and an (n+1)-th actual position waveform being superimposed on one another along a time axis, n being a natural number, the n-th commanded oscillation waveform being an n-th waveform of the commanded oscillatory movement quantity produced by the division performed by the first waveform divider, the (n+1)-th commanded oscillation waveform being an (n+1)-th waveform of the commanded oscillatory movement quantity produced by the division performed by the first waveform divider, the n-th actual position waveform being an n-th waveform of the actual position produced by the division performed by the second waveform divider, the (n+1)-th actual position waveform being an (n+1)-th waveform of the actual position produced by the division performed by the second waveform divider.

2. The numerical control device according to claim 1, wherein
the display controller highlights a first air-cut region distinguishably from regions other than the first air-cut region, the first air-cut region being a region in which the n-th commanded oscillation waveform is greater than the (n+1)-th commanded oscillation waveform, among regions enclosed by the n-th commanded oscillation waveform and the (n+1)-th commanded oscillation waveform.

3. The numerical control device according to claim 1, wherein
in a case in which a first air-cut region is not present, the display controller displays a first guidance for allowing the first air-cut region to appear, the first air-cut region being a region in which the n-th commanded oscillation waveform is greater than the (n+1)-th commanded oscillation waveform, among regions enclosed by the n-th commanded oscillation waveform and the (n+1)-th commanded oscillation waveform.

4. A machine learning device comprising:
observation circuitry to observe information on the first air-cut region and modification information on various parameters that are changed in a case in which the first air-cut region does not appear, output from the numerical control device according to claim 3, and to output first state information being information including these pieces of information being associated with one another; and
learning circuitry to learn the first state information, as a state variable, output from the observation circuitry, and to output, to the numerical control device, information on the first guidance for allowing the first air-cut region to appear, in a case in which the first air-cut region is not present.

5. The numerical control device according to claim 1, wherein
the display controller highlights a second air-cut region distinguishably from regions other than the second air-cut region, the second air-cut region being a region in which the n-th actual position waveform is greater than the (n+1)-th actual position waveform, among regions enclosed by the n-th actual position waveform and the (n+1)-th actual position waveform.

6. The numerical control device according to claim 1, wherein
in a case in which a second air-cut region is not present, the display controller displays a second guidance for allowing the second air-cut region to appear, the second air-cut region being a region in which the n-th actual position waveform is greater than the (n+1)-th actual position waveform, among regions enclosed by the n-th actual position waveform and the (n+1)-th actual position waveform.

7. A machine learning device comprising:
observation circuitry to observe information on the second air-cut region and modification information on various parameters that are changed in a case in which the second air-cut region does not appear, output from the numerical control device according to claim 6, and to output second state information being information including these pieces of information being associated with one another; and
learning circuitry to learn the second state information, as a state variable, output from the observation circuitry, and to output, to the numerical control device, information on the second guidance for allowing the second air-cut region to appear, in a case in which the second air-cut region is not present.

8. The numerical control device according to claim 1, wherein
in a case in which a first air-cut region is present and a second air-cut region is not present, the display controller displays a second guidance for allowing the second air-cut region to appear, the first air-cut region being a region in which the n-th commanded oscillation waveform is greater than the (n+1)-th commanded oscillation waveform among regions enclosed by the n-th commanded oscillation waveform and the (n+1)-th commanded oscillation waveform, the second air-cut region being a region in which the n-th actual position waveform is greater than the (n+1)-th actual position waveform among regions enclosed by the n-th actual position waveform and the (n+1)-th actual position waveform.

9. A numerical control method for outputting, to a drive shaft controller that provides feedback control on a motor connected to a drive shaft provided on at least one of a tool or a workpiece, a vibration cutting command to machine the workpiece while causing the tool and the workpiece to move relative to each other, the feedback control being provided using a detector for detecting location information of the motor, the numerical control method comprising:
a first waveform dividing of dividing a waveform of a commanded oscillatory movement quantity specified by the vibration cutting command, into sections each corresponding to a unit time;
a second waveform dividing of dividing a waveform of an actual position detected by the detector into sections each corresponding to the unit time; and
a display control of displaying, on a display, an n-th commanded oscillation waveform, an (n+1)-th commanded oscillation waveform, an n-th actual position waveform, and an (n+1)-th actual position waveform being superimposed on one another along a time axis, n being a natural number, the n-th commanded oscillation waveform being an n-th waveform of the commanded oscillatory movement quantity produced by the dividing in the first waveform dividing, the (n+1)-th commanded oscillation waveform being an (n+1)-th waveform of the commanded oscillatory movement quantity produced by the dividing in the first waveform dividing, the n-th actual position waveform being an n-th waveform of the actual position produced by the dividing in the second waveform dividing, the (n+1)-th actual position waveform being an (n+1)-th waveform of the actual position produced by the dividing in the second waveform dividing.

10. A numerical control device including a control computer that outputs, to a drive shaft controller that provides feedback control on motors connected to a drive shaft provided on a tool and to a spindle provided on a workpiece, a vibration cutting command to machine the workpiece while causing the tool and the workpiece to move relative to each other, the feedback control being provided using a detector for detecting location information of the motors, the numerical control device comprising:
- a third waveform divider to perform a division of a waveform of a commanded oscillatory movement quantity specified by the vibration cutting command, into sections each corresponding to one rotation of the spindle;
- a fourth waveform divider to perform a division of a waveform of an actual position detected by the detector into sections each corresponding to one rotation of the spindle; and
- a display controller to display, on a display, an n-th commanded oscillation waveform, an (n+1)-th commanded oscillation waveform, an n-th actual position waveform, and an (n+1)-th actual position waveform being superimposed on one another with respect to a rotation angle during one rotation of the spindle, n being a natural number, the n-th commanded oscillation waveform being an n-th waveform of the commanded oscillatory movement quantity produced by the division performed by the third waveform divider, the (n+1)-th commanded oscillation waveform being an (n+1)-th waveform of the commanded oscillatory movement quantity produced by the division performed by the third waveform divider, the n-th actual position waveform being an n-th waveform of the actual position produced by the division performed by the fourth waveform divider, the (n+1)-th actual position waveform being an (n+1)-th waveform of the actual position produced by the division performed by the fourth waveform divider.

11. The numerical control device according to claim 10, wherein
the display controller highlights a third air-cut region distinguishably from regions other than the third air-cut region, the third air-cut region being a region in which the n-th commanded oscillation waveform is greater than the (n+1)-th commanded oscillation waveform, among regions enclosed by the n-th commanded oscillation waveform and the (n+1)-th commanded oscillation waveform.

12. The numerical control device according to claim 10, wherein
in a case in which a third air-cut region is not present, the display controller displays a third guidance for allowing the third air-cut region to appear, the third air-cut region being a region in which the n-th commanded oscillation waveform is greater than the (n+1)-th commanded oscillation waveform, among regions enclosed by the n-th commanded oscillation waveform and the (n+1)-th commanded oscillation waveform.

13. A machine learning device comprising:
observation circuitry to observe information on the third air-cut region and modification information on various parameters that are changed in a case in which the third air-cut region does not appear, output from the numerical control device according to claim 12, and to output third state information being information including these pieces of information being associated with one another; and
learning circuitry to learn the third state information, as a state variable, output from the observation circuitry, and to output, to the numerical control device, information on the third guidance for allowing the third air-cut region to appear, in a case in which the third air-cut region is not present.

14. The numerical control device according to claim 10, wherein
the display controller highlights a fourth air-cut region distinguishably from regions other than the fourth air-cut region, the fourth air-cut region being a region in which the n-th actual position waveform is greater than the (n+1)-th actual position waveform, among regions enclosed by the n-th actual position waveform and the (n+1)-th actual position waveform.

15. The numerical control device according to claim 10, wherein
in a case in which a fourth air-cut region is not present, the display controller displays a fourth guidance for allowing the fourth air-cut region to appear, the fourth air-cut region being a region in which the n-th actual position waveform is greater than the (n+1)-th actual position waveform, among regions enclosed by the n-th actual position waveform and the (n+1)-th actual position waveform.

16. A machine learning device comprising:
- an observation circuitry to observe information on the fourth air-cut region and modification information on various parameters that are changed in a case in which the fourth air-cut region does not appear, output from the numerical control device according to claim 15, and to output fourth state information being information including these pieces of information being associated with one another; and
- a learning circuitry to learn the fourth state information, as a state variable, output from the observation circuitry, and to output, to the numerical control device, information on the fourth guidance for allowing the fourth air-cut region to appear, in a case in which the fourth air-cut region is not present.

17. The numerical control device according to claim 10 wherein
in a case in which a third air-cut region is present and a fourth air-cut region is not present, the display controller displays a fourth guidance for allowing the fourth air-cut region to appear, the third air-cut region being a region in which the n-th commanded oscillation waveform is greater than the (n+1)-th commanded oscillation waveform among regions enclosed by the n-th commanded oscillation waveform and the (n+1)-th commanded oscillation waveform, the fourth air-cut region being a region in which the n-th actual position waveform is greater than the (n+1)-th actual position waveform among regions enclosed by the n-th actual position waveform and the (n+1)-th actual position waveform.

18. A numerical control method for outputting, to a drive shaft controller that provides feedback control on motors connected to a drive shaft provided on a tool and to a spindle provided on a workpiece, a vibration cutting command to machine the workpiece while causing the tool and the workpiece to move relative to each other, the feedback control being provided using a detector for detecting location information of the motors, the numerical control method comprising:
- a third waveform dividing of dividing a waveform of a commanded oscillatory movement quantity specified by the vibration cutting command, into sections each corresponding to one rotation of the spindle;
- a fourth waveform dividing of dividing a waveform of an actual position detected by the detector into sections each corresponding to one rotation of the spindle; and a display control of displaying, on a display, an n-th commanded oscillation waveform, an (n+1)-th commanded oscillation waveform, an n-th actual position waveform, and an (n+1)-th actual position waveform being superimposed on one another with respect to a rotation angle during one rotation of the spindle, n being a natural number, the n-th commanded oscillation waveform being an n-th waveform of the commanded oscillatory movement quantity produced by the dividing in the third waveform dividing, the (n+1)-th commanded oscillation waveform being an (n+1)-th waveform of the commanded oscillatory movement quantity produced by the dividing in the third waveform dividing, the n-th actual position waveform being an n-th waveform of the actual position produced by the dividing in the fourth waveform dividing, the (n+1)-th actual position waveform being an (n+1)-th waveform of the actual position produced by the dividing in the fourth waveform dividing.

* * * * *